United States Patent
Zhao et al.

(10) Patent No.: US 7,342,936 B2
(45) Date of Patent: Mar. 11, 2008

(54) METHOD OF PERFORMING DEFICIT ROUND-ROBIN SCHEDULING AND STRUCTURE FOR IMPLEMENTING SAME

(75) Inventors: Yongdong Zhao, Plano, TX (US); Craig A. Lindahl, McKinney, TX (US)

(73) Assignee: Integrated Device Technology, Inc., San Jose, CA (US)

( * ) Notice: Subject to any disclaimer, the term of this patent is extended or adjusted under 35 U.S.C. 154(b) by 868 days.

(21) Appl. No.: 10/174,435

(22) Filed: Jun. 17, 2002

(65) Prior Publication Data

US 2003/0231590 A1 Dec. 18, 2003

(51) Int. Cl.
*H04L 12/54* (2006.01)
*H04L 12/56* (2006.01)

(52) U.S. Cl. .................. 370/429; 370/395.1

(58) Field of Classification Search ............ None
See application file for complete search history.

(56) References Cited

U.S. PATENT DOCUMENTS

| | | | |
|---|---|---|---|
| 5,748,614 A | 5/1998 | Wallmeier | |
| 6,064,677 A | 5/2000 | Kappler et al. | |
| 6,101,193 A * | 8/2000 | Ohba | 370/429 |
| 6,134,217 A | 10/2000 | Stiliadis et al. | |
| 6,137,807 A | 10/2000 | Rusu et al. | |
| 6,154,446 A | 11/2000 | Kadambi et al. | |
| 6,198,723 B1 | 3/2001 | Parruck et al. | |
| 6,247,061 B1 | 6/2001 | Douceur et al. | |
| 6,810,426 B2 * | 10/2004 | Mysore et al. | 709/234 |
| 2002/0167955 A1 * | 11/2002 | Shimojo | 370/411 |
| 2002/0178282 A1 * | 11/2002 | Mysore et al. | 709/234 |
| 2003/0179774 A1 * | 9/2003 | Saidi et al. | 370/468 |
| 2003/0214964 A1 * | 11/2003 | Shoham et al. | 370/412 |

OTHER PUBLICATIONS

M. Katevenis, Chpt. 3, "Buffer Memory Technologies and Architectures" and Chpt. 7, "Output Scheduling for QoS", Online Lecture Notes for CS-534: Packet Switch Architecture, Dept. of Computer Science, University of Crete, Greece, Fall 2001, 31 pages, http://www.ics.forth.gr/~kateveni/534/01f/.
"Efficient Fair Queuing using Deficit Round Robin" by M. Shreedhar and George Varghese, Oct. 16, 1995, pp. 1-22.

* cited by examiner

*Primary Examiner*—Huy D. Vu
*Assistant Examiner*—Clemence Han
(74) *Attorney, Agent, or Firm*—Bever, Hoffman & Harms LLP

(57) ABSTRACT

A deficit round-robin scheduler including a round-robin table configured to store a plurality of cycle link lists, wherein each cycle link list includes a head flow identification (FLID) value identifying a first flow of the cycle link list, and a tail FLID value identifying a last flow of the cycle link list. A flow table is provided having a plurality of flow table entries, wherein each of the flow table entries is associated with a corresponding flow, and therefore has a corresponding FLID value. A packet queue is associated with each flow table entry, wherein each packet queue is capable of storing a plurality of packets. The deficit round-robin scheduler also included an idle cycle register having an idle cycle entry corresponding with each of the cycle link lists, wherein each idle cycle entry identifies the corresponding cycle link list as active or idle.

19 Claims, 13 Drawing Sheets

US 7,342,936 B2

METHOD OF PERFORMING DEFICIT ROUND-ROBIN SCHEDULING AND STRUCTURE FOR IMPLEMENTING SAME

BACKGROUND OF THE INVENTION

1. Field of the Invention

The present invention relates to an improved queuing method for implementing deficit round-robin (DRR) scheduling for high-speed packet switching and routing.

2. Related Art

Queuing and scheduling are two critical function blocks that are used by today's packet switches and routers to support quality of services (QoS). A typical packet switch/router has multiple ports forwarding and receiving data packets. Usually a data packet enters a switch/router from one port and departs from another port. The switch/router ports can each receive and forward data packet simultaneously.

FIG. 1 is a block diagram of a high-level switch/router architecture 100 that includes switch ports 101-108 and switch/router 110. Switch/router 110 includes line cards 111-118 and switch fabric 120. Data packets arrive at the left hand side switch ports 101-104 (i.e., ingress ports) and are provided to the corresponding line cards 111-114. The data packets are then processed by switch fabric 120, and then depart from the right hand side ports 105-108 (i.e., egress ports) via line cards 115-118.

During normal operation, multiple packets may be received from several ingress ports and leave switch/router 110 on one egress port. These packets must be queued in front of the egress port to wait for an opportunity to be forwarded.

FIG. 2 is a block diagram of line card 115, which includes multiple queues $201_1$-$201_N$ for storing data packets received from ingress ports 101-104, and scheduler 210. Each of queues $201_1$-$201_N$ is controlled by scheduler 210. Based on QoS requirements, scheduler 210 selects one of queues $201_1$-$201_N$ to send data packets over the egress port 105.

Different queuing and scheduling algorithms are implemented in switches and routers to meet various QoS requirements. The simplest is the First-In-First-Out (FIFO) scheme where packets are stored in one queue and sent in the same order as they are received. The drawback of the FIFO scheme is that bandwidth is not distributed fairly among all of the traffic flows. A few aggressive flows can seize most of the bandwidth. To solve this problem, a per-flow queue based scheduling algorithm, called the round-robin (RR) scheduling scheme, has been introduced. The idea of round-robin scheduling, in essence, is that traffic from different flows are queued separately in their own queues and the switch/router port scheduler circularly and repeatedly "visits" all the packet queues, and sends one packet from each queue during the visit. In terms of distributing bandwidth among different flows, round-robin scheduling is a fairer solution than FIFO scheduling because each flow can be guaranteed the opportunity to send a packet in each round-robin scheduling cycle.

However, round-robin scheduling has two problems. The first problem is that this scheme cannot differentiate large packets from small packets. When a flow sends a packet ten times larger than packets sent by other flows, this flow uses ten times more bandwidth than the other flows. To be fair, the packet length has to be taken into consideration in the scheduling algorithm. In addition, in real network environments, different flows can have different bandwidth requirements and should not be treated as equal. In other words, each flow is given a weighting factor and the bandwidth should be distributed to all the flows proportional to their weights. Round-robin scheduling is not capable of controlling bandwidth distribution in a weighted manner.

To resolve these issues, different scheduling schemes have been proposed. One popular scheduling scheme is the so-called deficit round-robin (DRR) scheme described by M. Shreedhar and George Varghese, "Efficient Fair Queuing using Deficit Round-robin", pp. 1-22, October 1995. However, the implementation technique proposed by Shreedhar et al. can only be used in switch routers with either slow port speeds or a small number of queues. When the techniques described by Shreedhar et al. are used on a high-speed port with a large number of queues, packets are forwarded at a speed that is lower than the full line rate.

Deficit round-robin scheduling is based on round-robin scheduling. Suppose that N flows are configured to send traffic on a switch/router port with N queues to receive the incoming data packet traffic. Each flow "i" is allowed to send $Quantum_i$ worth of bytes of traffic in each round-robin cycle. Deficit round-robin takes the packet length into consideration when servicing a packet. During the first round-robin scheduling cycle, a packet in queue "i" can be sent if its length is not greater than $Quantum_i$. When a packet is sent, the difference between the packet length and $Quantum_i$ is stored in a flow parameter called $Credit_i$. For idle flows, the credit ($Credit_i$) is reset to zero. If the packet length is greater than $Quantum_i$, the packet is not forwarded in the present cycle, but the corresponding flow parameter, $Credit_i$, is increased by $Quantum_i$. During the next cycle of round-robin scheduling, the packet is processed again and is sent if the packet length is less than or equal to $Credit_i$+$Quantum_i$.

The following method is proposed by Shreedhar et al. to implement deficit round-robin scheduling. First, to avoid examining empty queues, a link list of active queues is maintained. The DDR scheduler only considers the queues on the active list. The queue at the head of the link list is processed first. Suppose that queue "i" is at the head of the active queue link list. If the queue head packet in queue "i" has length $Pkt\_Length_i$ no greater than $Quantum_i$+$Credit_i$, the packet is sent and $Credit_i$ is updated as $Credit_i$=$Quantum_i$+$Credit_i$−$Pkt\_Length_i$. After the packet is sent, queue "i" is moved to the tail of the active queue link list (if there are more packets waiting in queue "i"). If $Pkt\_Length_i$>$Quantum_i$+$Credit_i$, then no packet is sent, $Credit_i$ is updated as $Credit_i$=$Credit_i$+$Quantum_i$, and queue "i" is moved to the tail of the active link list. More discussion on the DRR scheme can be found in Shreedhar et al.

The implementation method proposed by Shreedhar et al. is not scalable to forward packets at full line rate when used for high-speed ports with large numbers of queues. The main reason is that this technique can result in time gaps during which packets do not get forwarded. As a result, the switch/router port sends fewer packets than could be supported by the full line rate. For example, assume that there are 64K active flow queues in the active queue link list, and in each queue, the queue head packet length is greater than $Credit_i$+$Quantum_i$. No packet is forwarded while the dequeue machine is constantly visiting each of the 64K queues one by one, updating the associated $Credit_i$ parameters and then moving the queues to the tail of the active queue link list. During this process, data packets are read from the queue memory and then written back. If it takes T (seconds) to process one queue, then for a 64K*T (seconds) time interval, the egress throughput is zero. If each data packet length is 40 bytes and T=10 ns (for reading from and writing to the queue RAM block), then 64K*10 ns=0.6 ms. For an OC-48 port, 4.7K packets can be forwarded in 0.6 ms. However, no packets are sent with the example given for the implementation technique of Shreedhar et al.

There are two problems with the implementation proposed by Shreedhar et al. The first problem is that a packet has to be read out of the queue memory before the process can determine whether the packet is eligible to be sent in the current cycle. If the packet is not eligible, the packet must be written back to the queue memory and wait to be considered in the next cycle. During that memory access cycle, no packet can be sent, resulting in egress port bandwidth being wasted. The second problem is that a Head of Line (HOL) blocking condition can occur, because only one queue link list is used. The queue at the head of the link list must be processed even if the corresponding packet is ready to be forwarded in the current cycle.

It would therefore be desirable to have an improved technique for solving the scalability problem of the existing DRR scheme provided by Shreedhar et al. It would further be desirable if this improved technique provides a solution to support line rate forwarding for high-speed ports with large numbers of queues.

SUMMARY

Accordingly, the present invention provides an improved method for implementing deficit round-robin scheduling. In accordance with one embodiment of the present invention, packets received from various flows are enqueued as follows. Each of the packets is received from an associated flow. Each flow is identified by a unique flow identification (FLID) value. All received packets having the same FLID value are stored in the same packet queue (i.e., there is a packet queue associated with each of the flows). Each packet queue is organized and maintained using a flow table entry. Each flow table entry stores the address of the first packet in the packet queue and the address of the last packet in the packet queue. A pre-pended header is added to each of the received packets. This pre-pended header includes a next address pointer, which identifies the address of the next packet in the packet queue. This pre-pended header also includes a next packet length parameter, which identifies the length of the next packet in the packet queue.

Each flow table entry also stores a Credit value, a Quantum value, and a packet count value. The packet count value indicates the number of received packets stored in the associated packet queue.

The DDR scheduler determines the cycle number in which the first packet in a packet queue will be processed (and updates the Credit value) in response to the Credit value, the Quantum value, and the length of the first packet. When the first packet is dequeued (i.e., sent to the egress port), the DDR scheduler determines the cycle number in which the second packet in the packet queue will be processed in response to the Credit value, the Quantum value, and the next packet length parameter read from the pre-pended header of the first packet.

The DRR scheduler also includes a plurality of cycle link lists, one for each cycle. This is different from the above-described method of Shreedhar et al., which uses only one link list. If it is determined that the first packet of a flow is to be sent to the egress port during the $K^{th}$ cycle, then that flow is added to the $K^{th}$ cycle link list. More specifically, the flow table entry for the flow is linked to the tail of the $K^{th}$ cycle link list.

Each cycle link list includes a head FLID pointer that identifies the first flow table entry in the cycle link list, and a tail FLID pointer that identifies the last flow table entry in the cycle link list. Each flow table entry further includes a next FLID pointer, which identifies the next flow table entry in the cycle link list. In this manner, all of the packets to be sent to the egress port during the $K^{th}$ cycle are linked.

An idle cycle register is provided in accordance with one embodiment of the present invention. The idle cycle register includes one 1-bit idle cycle indicator for each cycle. If a cycle link list is linked to at least one flow table entry (i.e., at least one packet waiting to be dequeued), then the associated idle cycle indicator is de-activated, thereby indicating that the cycle link list is active (not idle). Conversely, if a cycle link list is linked no flow table entries, then the associated idle cycle indicator is activated, thereby indicating that the cycle link list is idle. The DRR scheduler only processes active cycle link lists, thereby improving processing speed (i.e., packet throughput).

When an active cycle link list is processed, the head packet of each flow identified by an active cycle link list is sent to the egress port. Each flow table entry is then assigned to a new cycle link list (assuming that there is still at least one packet associated with the flow table entry). The current cycle link list becomes idle, and the DRR scheduler continues processing with the next non-idle cycle link list.

The present invention will be more fully understood in view of the following description and drawings.

DETAILED DESCRIPTION

Figure 1:
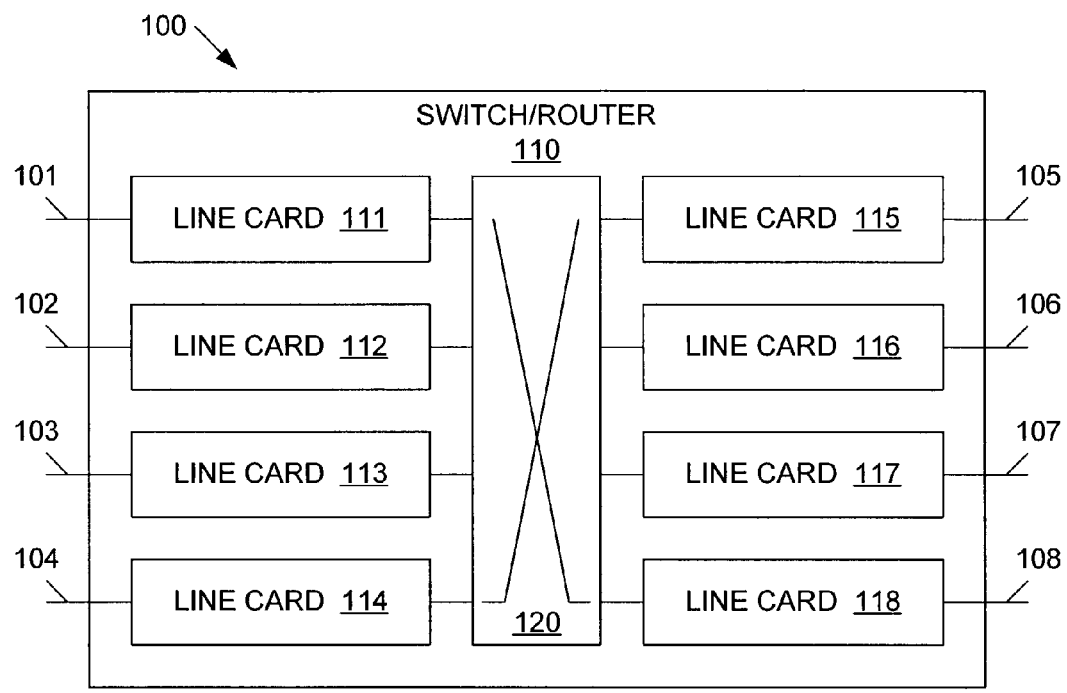
FIG. 1 is a block diagram of a conventional high-level switch/router architecture that includes switch ports and a switch/router.
Figure 2:
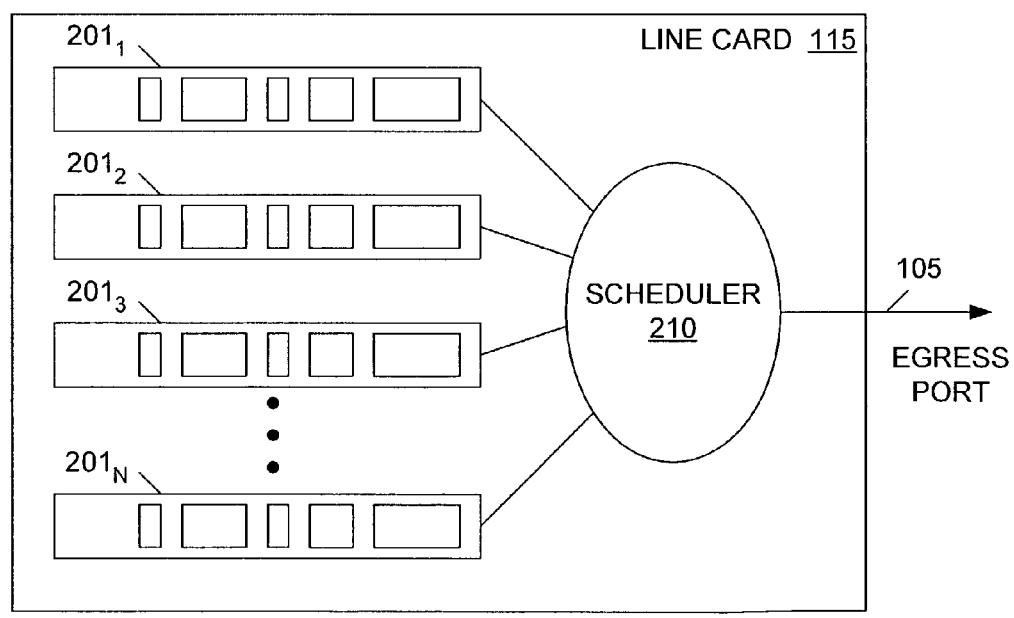
FIG. 2 is a block diagram of a conventional line card, which includes multiple queues for storing data packets received from ingress ports, and a scheduler.

In accordance with the present invention, an improved DRR scheduling scheme calculates in advance the cycle number ($R_{NEW}$) in which a packet will be sent so that the packet is not read from the queue memory until the packet becomes eligible to be sent. To avoid the HOL blocking condition, multiple cycle link lists are used, so that the DDR scheduler can always work on cycle link list with packets that are ready to be forwarded. Specifically, suppose that the DRR scheduler is currently working on cycle $R_{CURRENT}$, and a new packet is moved to the head of queue "i". Using Quantum and Credit values associated with queue "i" and the length of the new packet, a set of equations (which are described in more detail below) are used to determine that the new packet should be sent to the egress port $R_{OFFSET}$ cycles after the current cycle $R_{CURRENT}$.

The present invention provides: (1) a technique of predicting the cycle number, $R_{NEW}$, in which a packet is to be dequeued by the DRR scheduler, (2) a technique of calculating cycle number $R_{NEW}$, (3) the manner of organizing all of the packets that should be sent to the egress port during cycle $R_{NEW}$. These three issues are discussed in the following description. Because there is a maximum length for data packets (e.g., 9K for Ethernet), there exists a maximum offset cycle number $R_{MAX}$ so that $R_{OFFSET} < R_{MAX}$. In the described examples, $R_{MAX}$ is selected to be 1024, although this is not necessary.

Before further describing the DRR technique of the present invention, the terms "flow table" and "flow identification" (or FLID), shall be introduced. A flow table contains the parameters necessary for processing received data packets. The flow table entries (e.g., assigned bandwidth and accumulated credit) are stored in either an external or internal memory block called the flow table memory. Each flow has a corresponding flow table entry in the flow table memory.

A flow identification (FLID) value is used to identify each individual packet flow. The FLID value is defined as an H-bit field, where H is a given integer. In the described example, H is equal to 32, although this is not necessary. The FLID value is used as a direct or indirect memory address for accessing a flow table entry for a corresponding packet flow. The FLID value can be encoded from the address portion of a received packet, such as the source/destination address in an Internet Protocol (IP) packet or an Ethernet frame. Alternately, the FLID value or a modified (e.g., truncated) version of the FLID value can be appended to the received packet so that a FLID value encoding process is not required.

In accordance with one embodiment of the present invention, the FLID value is used to directly address the flow table. Thus, when a data packet is received from an ingress port, the corresponding FLID value is appended to the beginning of the packet. As described below, the parameters used to process the packet are found in the flow table memory at an address corresponding to the FLID value.

Equations to Determine the Cycle Number

In accordance with the present invention, a finite length counter is used to identify the cycle number currently being processed by the DRR scheduler of the present invention. The counter sequentially increments the cycle number from 1 to $R_{MAX}$ using a counter that is $\log_2(R_{MAX})$ bits wide. After the counter reaches a count value of $R_{MAX}$, the counter wraps around, such that the next count value is "1". The current count (i.e., the current cycle) is identified by the parameter $R_{CURRENT}$. As described in more detail below one or a plurality of packets may be scheduled to be sent to the egress port during a cycle.

In order to calculate the cycle number in which a received packet will be processed (i.e., sent to the egress port), several parameters are required. These parameters include the length of the packet (Pkt_Length), the Quantum value (Quantum) for the flow, and the Credit value (Credit) for the flow. The general idea of Quantum and Credit values has been introduced above in connection with conventional deficit round-robin scheduling.

The cycle number in which the received packet will be processed is defined by a cycle offset value ($R_{OFFSET}$), which is calculated as set forth below in Equation (1).

$$R_{OFFSET} = \min\{R_{MAX}-1, (|Pkt\_Length-Credit|/Quantum)\}, \quad (1)$$

where $|A-B| = \max\{0, A-B\}$

The cycle offset value $R_{OFFSET}$ is added to the current cycle number $R_{CURRENT}$, in order to determine the cycle number in which the received packet will be processed ($R_{NEW}$). This relationship is summarized in Equation (2).

$$R_{NEW} = (R_{CURRENT} + R_{OFFSET}) \bmod (R_{MAX}) \quad (2)$$

where "mod" is the standard mathematical modulo operation. For example, (4)mod(3)=1, and (8)mod(3)=2.

In addition to calculating the cycle number ($R_{NEW}$) in which the received packet will be processed, the Credit value for the flow must also be updated, so that this Credit value can be used to calculate the cycle offset number ($R_{OFFSET}$) for the next packet in the flow. The Credit value is updated in the manner defined by Equation (3).

$$\text{Credit} = \text{Credit} + (\text{Quantum} * R_{OFFSET}) - Pkt\_\text{Length} \quad (3)$$

As described in more detail below, the calculations defined by Equations (1)-(3) are only performed for a given packet of a flow when the previous packet in same flow is sent to the egress port during the current cycle $R_{CURRENT}$.

Cycle Link Lists

In the present invention, a total of $R_{MAX}$ cycle link lists are used, one for each of the $R_{MAX}$ cycles. This is different from the above-described method of Shreedhar et al., which uses only one link list. The cycle link lists are identified as follows: Link_List$_1$, Link_List$_2$, . . . , Link_List$_{RMAX}$. Link_List$_K$ is the cycle link list of all the flows that have a packet to be forwarded in the $K^{th}$ cycle. If Equations (1)-(3) determine that the head (i.e., first) packet of a flow is to be sent to the egress port during the $K^{th}$ cycle, then that flow is added to Link_List$_K$. More specifically, the flow is added to the tail of Link_List$_K$, in a manner described in more detail below.

After the head packet of the flow has been sent to the egress port during the $K^{th}$ cycle, the next packet in the flow becomes the new head packet of the flow. At this time, Equations (1)-(3) are used to determine the cycle offset value ($R_{OFFSET}$) and the new cycle number ($R_{NEW}$) for the new head packet of the flow, as well as the new Credit value of the flow. The flow is then removed from Link_List$_K$ and added to the tail of Link_List$_J$, wherein $J = R_{NEW}$.

Round-Robin (RR) Table

Figure 3:
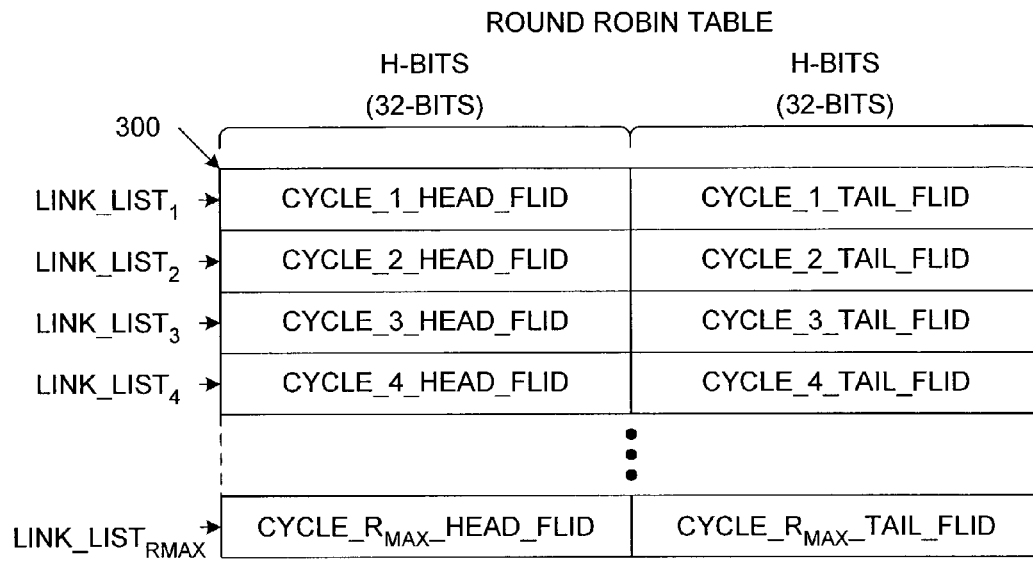
FIG. 3 is a block diagram illustrating a round-robin table that defines the $R_{MAX}$ cycle link lists in accordance with one embodiment of the present invention.

FIG. 3 is a block diagram illustrating a round-robin table 300 that defines the $R_{MAX}$ cycle link lists (i.e., Link_List$_1$, Link_List$_2$, Link_List$_3$, Link_List$_4$, . . . Link_List$_{RMAX}$). More specifically, round-robin table 300 stores the head and tail flow identification (FLID) values for each of the $R_{MAX}$ cycle link lists. Thus, each cycle link list, Link_List$_K$, is defined by a first flow added to the cycle link list (identified by the FLID value=Cycle_K_Head_FLID), and a last flow added to the cycle link list (identified by the FLID value=Cycle_K_Tail_FLID). Flows added to the cycle link list, Link_List$_K$, between the first flow and the last flow are identified by flow table entries in the manner described below.

Round-robin table 300 can be implemented by either external or internal memory.

Flow Table

Figure 4:
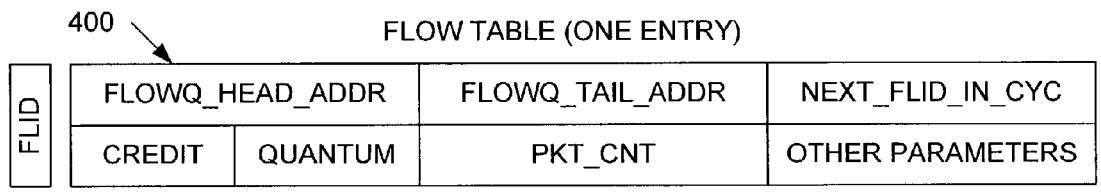
FIG. 4 is a block diagram of a flow table entry in accordance with one embodiment of the present invention.

FIG. 4 is a block diagram of a flow table entry 400 in accordance with one embodiment of the present invention. Each flow has a corresponding flow table entry identical to flow table entry 400. As described in more detail below, each flow table entry has an associated packet queue, which stores the packets associated with the flow. Flow table entry 400 includes pointers to this associated packet queue. These pointers include the address of the first packet in the packet queue (FlowQ_Head_Addr), and the address of the last packet in the packet queue (FlowQ_Tail_Addr).

Flow table entry 400 also includes a pointer (Next_FLID_in_Cyc) to the next flow to be processed in the same cycle. Thus, this pointer (Next_FLID_in_Cyc) is used to link successive flows in the cycle link list.

Flow table entry 400 also stores the updated Credit and Quantum values for the associated flow. As described above, these Credit and Quantum values are used in Equations (1)-(3) of the DRR scheduling algorithm.

Flow table entry 400 also stores a parameter (Pkt_Cnt) that identifies the number of packets currently stored in the associated packet queue. If the Pkt_Cnt value is equal to zero, then no packets are stored in the associated packet queue, or in other words, the packet queue is empty. Flow table entry 400 is also capable of storing other parameters related to processing of the packet queue.

Packet Header for Cycle Link Lists and Flow Queues

Figure 5:
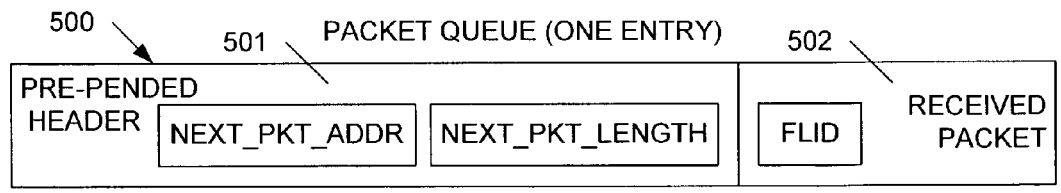
FIG. 5 is a block diagram illustrating a packet queue entry, which includes a pre-pended header and a packet in accordance with one embodiment of the present invention.

To support the cycle link lists, the flow tables and the packet queues, a header is pre-pended to the beginning of each received packet. The pre-pended header and the associated packet can be stored in different physical memory devices. For example, the pre-pended header can be stored in an external SRAM, and the packet can be stored in an external SDRAM. In another embodiment, both the pre-pended header and the associated packet can be stored in the same physical memory device. FIG. 5 is a block diagram illustrating a packet queue entry 500, which includes pre-pended header 501 and packet 502. Pre-pended header 501 includes a packet queue pointer (Next_Pkt_Addr) that identifies the address of the next packet in the packet queue. Pre-pended header 501 also includes a packet length parameter (Next_Pkt_Length) that identifies the length of the next packet in the packet queue. This packet length parameter (Next_Pkt_Length) is used as the "Pkt_Length" parameter in Equation (1) in order to calculate the cycle offset value, $R_{OFFSET}$.

The Next_Pkt_Addr and Next_Pkt_Length parameters of pre-pended header 501 are updated with the appropriate values when the next packet (not shown) is added to the packet queue. All of the packet queue entries are stored in a flow queue memory.

When the packet queue entry 500 is processed, pre-pended header 501 is stripped off, and only the packet 502 is sent to the egress port. As described above, packet 502 includes the FLID value that identifies the corresponding flow. Pre-pended header 501 may also contain other information not directly related to the DRR scheduling scheme of the present invention.

Idle Cycle Register

Figure 6:
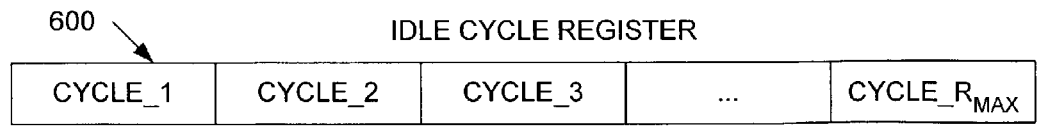
FIG. 6 is a block diagram of an idle cycle register in accordance with one embodiment of the present invention.

FIG. 6 is a block diagram of an idle cycle register 600 in accordance with one embodiment of the present invention. Idle cycle register 600 includes $R_{MAX}$ entries, wherein each entry corresponds with one of the $R_{MAX}$ Cycle Link Lists. Each entry of idle cycle register 600 stores a 1-bit idle cycle indicator, Cycle_K, that indicates the status of the corresponding Cycle Link List, Link_List$_K$. For example, if the 1-bit idle cycle indicator, Cycle_K, has a logic "1" value, then the corresponding cycle link list, Link_List$_K$, is idle, and does not require processing. Conversely, if the 1-bit idle cycle indicator, Cycle_K, has a logic "0" value, then the corresponding cycle link list, Link_List$_K$, is active, and should be processed.

The DRR scheduler of the present invention only processes the active cycle link lists (i.e., the cycle link lists having a corresponding "0" value in idle cycle register 600). By skipping the idle cycle link lists, processing speed is improved.

After the head packet of each flow identified by an active cycle link list has been sent to the egress port, the current cycle link list becomes idle, and the DRR scheduler continues processing with the next non-idle cycle link list. For example, if the DRR scheduler is currently processing Link_List$_K$, and a packet has been sent from the last flow of this cycle link list (as identified by Cycle_K_Tail_FLID), then the corresponding entry of idle cycle register 600 (i.e., Cycle_K) is set to a logic "1" value, thereby rendering Link_List$_K$ idle. The DRR scheduler then begins processing the next non-idle cycle link list identified by idle cycle register 600 (i.e., the cycle link list having the next "0" entry in idle cycle register 600).

Idle cycle register 600 may be implemented externally or internally. However, an internal implementation is preferable to provide for faster access.

Per-Flow Packet Queue

The packet queue for a single flow having a FLID value equal to "H" will now be described. FIGS. 7A-7D are block diagrams illustrating the flow table entry 701 for the flow having a FLID value equal to "H" and the corresponding packet queue. Flow table entry 701 is stored at address "H" of a flow table memory in accordance with the described embodiment. Although flow table entry 701 is identical to flow table entry 400, only three parameters of flow table entry 701 (FlowQ_Head_Addr, FlowQ_Tail_Addr, and Pkt_Cnt) are shown for purposes of clarity.

Figure 7A:
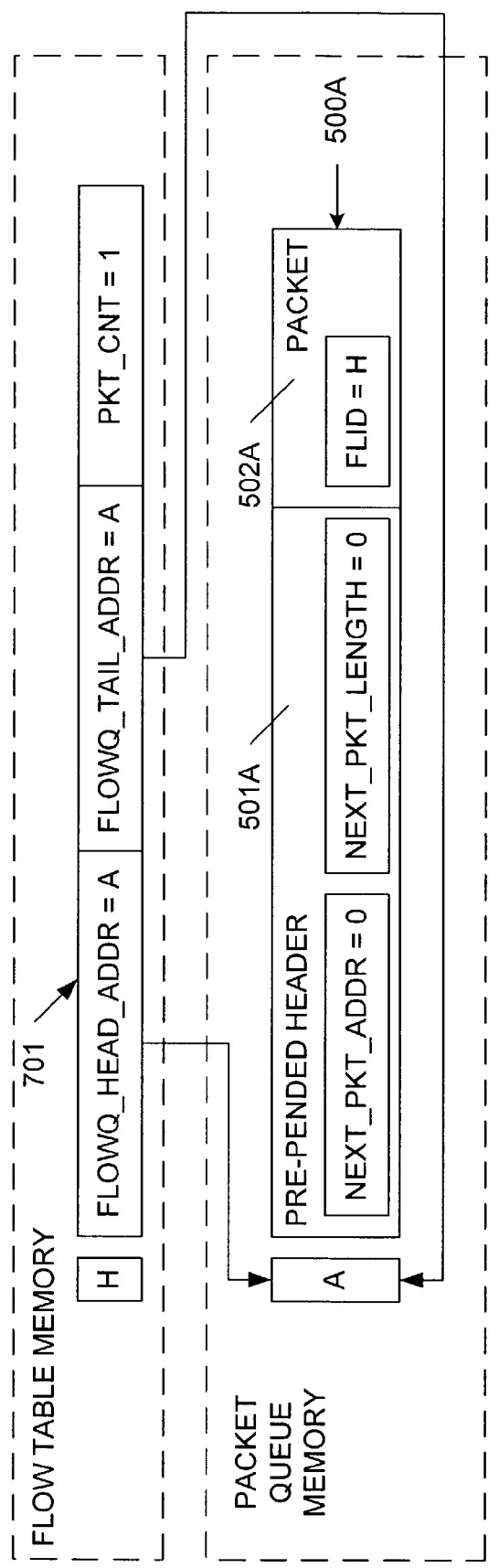
FIGS. 7A-7D are block diagrams illustrating a flow table entry for a flow having a FLID value equal to "H" and the corresponding packet queue in accordance with one embodiment of the present invention.

As illustrated in FIG. 7A, a first packet queue entry 500A is initially added to the packet queue associated with FLID value "H". The first packet queue entry 500A is stored at address "A" of the packet queue memory. This first packet queue entry 500A includes pre-pended header 501A and packet 502A. The FlowQ_Head_Addr pointer of flow table entry 701 is set to a value of "A", thereby properly identifying packet queue entry 500A as the first entry in the packet queue. The FlowQ_Tail_Addr pointer of flow table entry 701 is also set to a value of "A", thereby properly identifying packet queue entry 500A as the last (i.e., only) entry in the packet queue. Because there is only one entry 500A in the packet queue, the Next_Pkt_Addr and Next_Pkt_Length parameters of pre-pended header 501A are initially null values. The Pkt_Cnt value is incremented to a value of "1", thereby indicating that the packet queue stores one entry.

Note that when the first packet queue entry 500A is enqueued, the DDR scheduler calculates the cycle offset value $R_{OFFSET}$ in accordance with Equation (1), using the Credit and Quantum values stored by the flow table entry 701, and the length of packet 502A. The cycle in which the first packet queue entry 500A is to be sent to the egress port (i.e., $R_{NEW}$) is then calculated in accordance with Equation (2). In the described example, $R_{NEW}$ is equal to "K". The flow table entry 701 is then added to the tail of the cycle link list associated with this cycle $R_{NEW}$, Link_List$_K$. The Credit value of flow table entry 701 is then updated in accordance with Equation (3). The first packet queue entry 500A is dequeued during the calculated cycle, "K". However, in the present example, two more packet queue entries (500B and 500C) are received before the first packet queue entry 500A is dequeued.

Figure 7B:
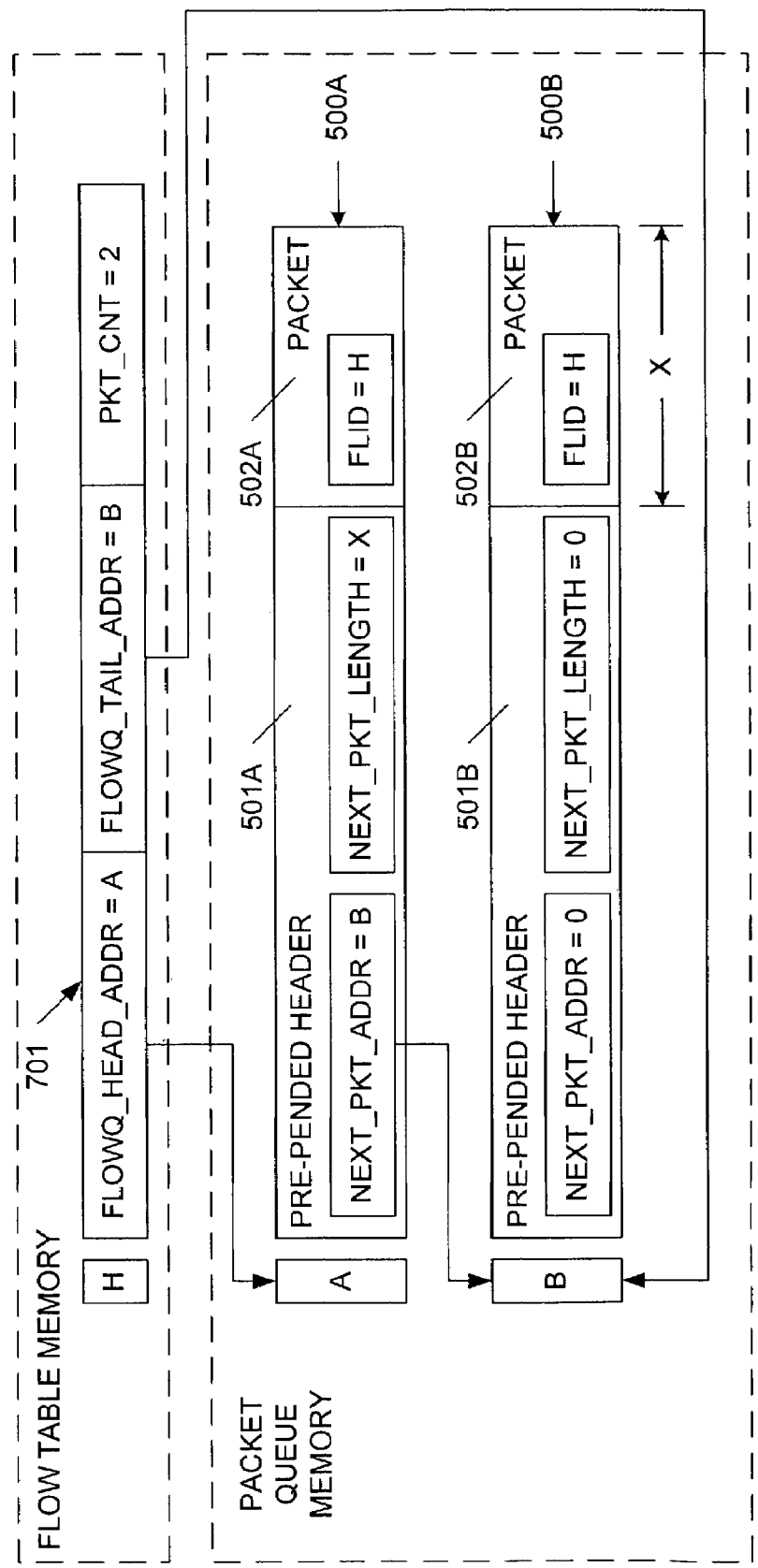

As illustrated in FIG. 7B, a second packet queue entry 500B is subsequently added to the packet queue associated with FLID value "H". The second packet queue entry 500B is stored at address "B" of the packet queue memory. This second packet queue entry 500B includes pre-pended header 501B and packet 502B. The FlowQ_Head_Addr pointer of flow table entry 701 remains set to a value of "A". However, the FlowQ_Tail_Addr pointer of flow table entry 701 is set to a value of "B", thereby properly identifying packet queue entry 500B as the last (and most recent) entry in the packet queue. The Next_Pkt_Addr parameter of pre-pended header 501A is set to a value of "B", thereby properly identifying packet queue entry 500B as the second entry in the packet queue. The Next_Pkt_Length parameter of pre-pended header 501A is set to a value of "X", which corresponds with the length of packet 502B. Because packet queue entry 500B is the last entry in the packet queue, the Next_Pkt_Addr and Next_Pkt_Length parameters of pre-pended header 501B are set to null values. The Pkt_Cnt value is incremented to a value of "2", thereby indicating that the packet queue stores two entries.

Figure 7C:
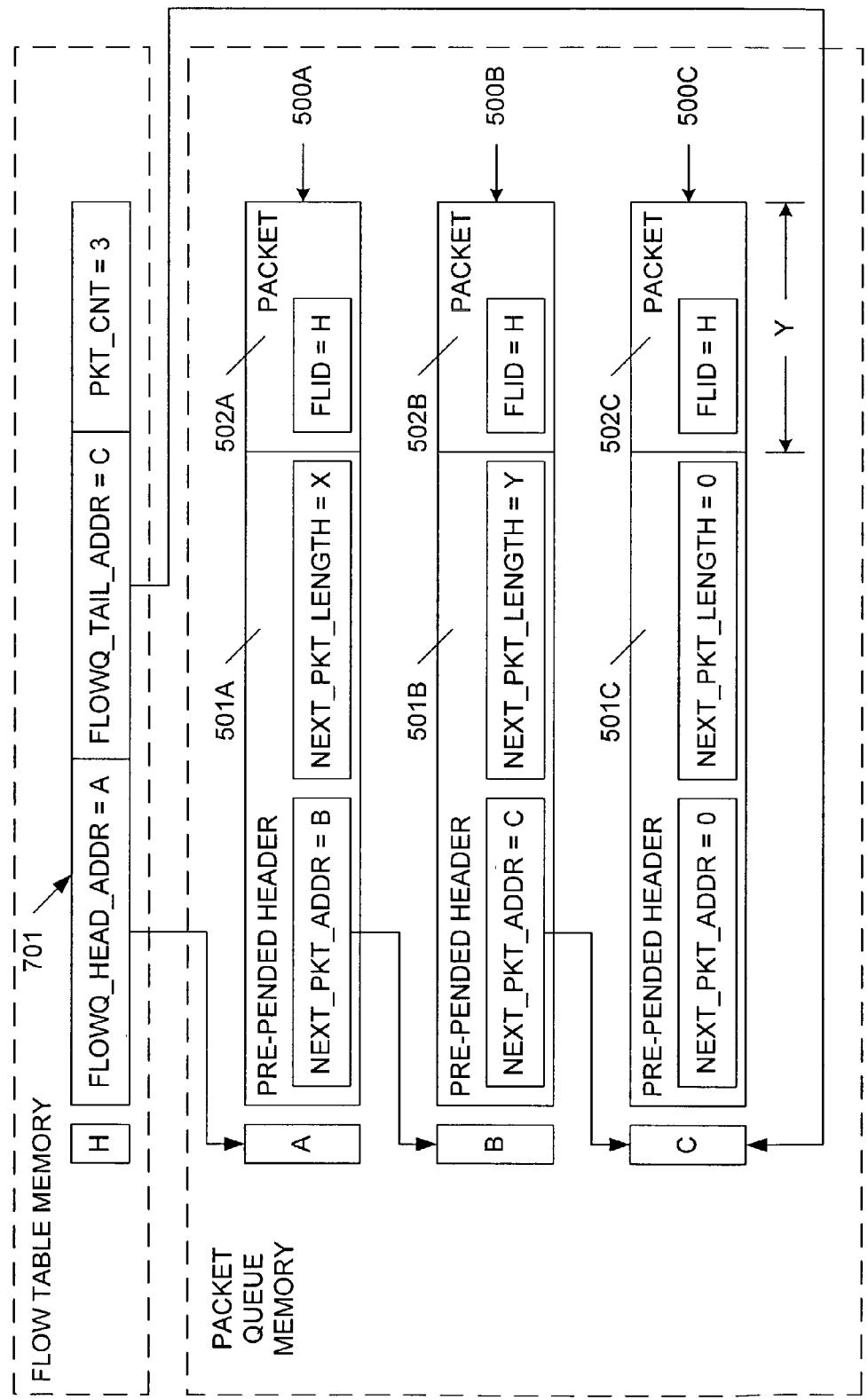

As illustrated in FIG. 7C, a third packet queue entry 500C is subsequently added to the packet queue associated with FLID value "H". The third packet queue entry 500C is stored at address "C" of the packet queue memory. This third packet queue entry 500C includes pre-pended header 501C and packet 502C. The FlowQ_Head_Addr pointer of flow table entry 701 remains set to a value of "A". However, the FlowQ_Tail_Addr pointer of flow table entry 701 is set to a value of "C", thereby properly identifying packet queue entry 500C as the last (and most recent) entry in the packet queue. The Next_Pkt_Addr parameter of pre-pended header 501B is set to a value of "C", thereby properly identifying packet queue entry 500C as the third entry in the packet queue. The Next_Pkt_Length parameter of pre-pended header 501B is set to a value of "Y", which corresponds with the length of packet 502C. Because packet queue entry 500C is the last entry in the packet queue, the Next_Pkt_Addr and Next_Pkt_Length parameters of pre-pended header 501C are set to null values. The Pkt_Cnt value is incremented to a value of "3", thereby indicating that the packet queue stores three entries.

Figure 7D:
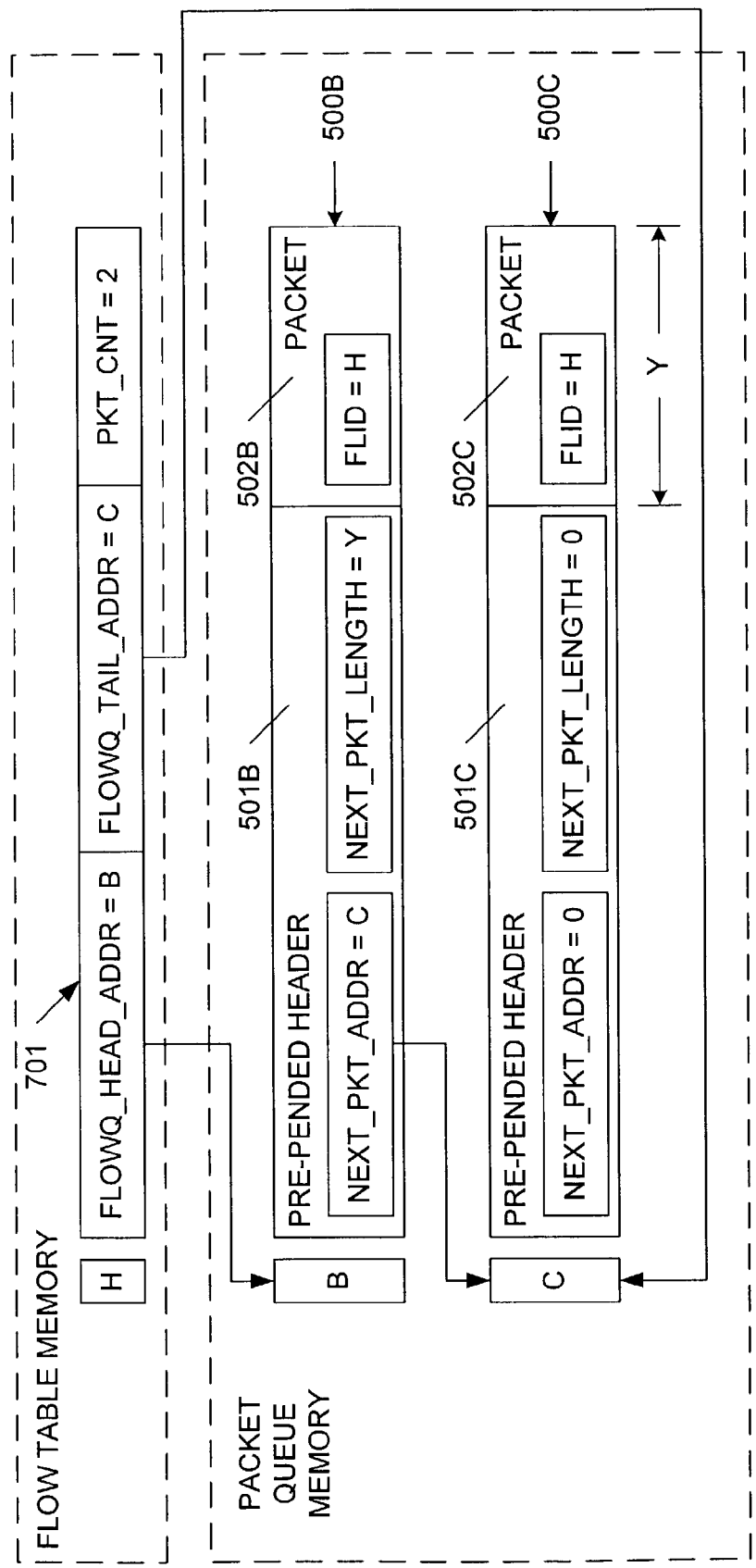

As illustrated in FIG. 7D, the DDR scheduler then processes the cycle link list (Link_List$_K$) associated with the above-calculated cycle, "K". At this time, the first packet queue entry 500A is dequeued (i.e., sent to the egress port). The dequeue process is implemented as follows.

The FlowQ_Head_Addr pointer is used to read the first packet queue entry 500A from address "A" of the packet queue memory. The DDR scheduler strips off pre-pended header 501A, and sends packet 502A to the egress port. The Next_Pkt_Addr value of pre-pended header 501A (i.e., "B"), is written to the FlowQ_Head_Addr pointer, thereby causing the second packet queue entry 500B to become the head packet queue entry. The Pkt_Cnt parameter of flow table entry 701 is decremented by one to a value of "2", thereby indicating that there are now two entries in the packet queue.

The DDR scheduler calculates a new cycle offset value $R_{OFFSET}$ in accordance with Equation (1), using the Credit and Quantum values stored by the flow table entry 701, and the Next_Pkt_Length parameter read from the pre-pended header 501A (i.e., "X"). The cycle in which the second packet queue entry 500B is to be sent to the egress port (i.e., $R_{NEW}$) is then calculated in accordance with Equation (2). In the described example, $R_{NEW}$ is equal to "J" for the second packet queue entry 500B. The flow table entry 701 is then added to the tail of the cycle link list associated with this cycle, "J" (i.e., Link_List$_J$). The Credit value of flow table entry 701 is then updated in accordance with Equation (3). The second packet queue entry 500B is subsequently dequeued during the newly calculated cycle, "J".

In the above-described manner, the three pointers, FlowQ_Head_Addr, FlowQ_Tail_Addr and Next_Pkt_Addr, are used to link all packets of the same flow.

Having described the flow table entries and the corresponding packet queues, the cycle link lists will now be described in more detail.

Cycle Link Lists

Figure 8A:
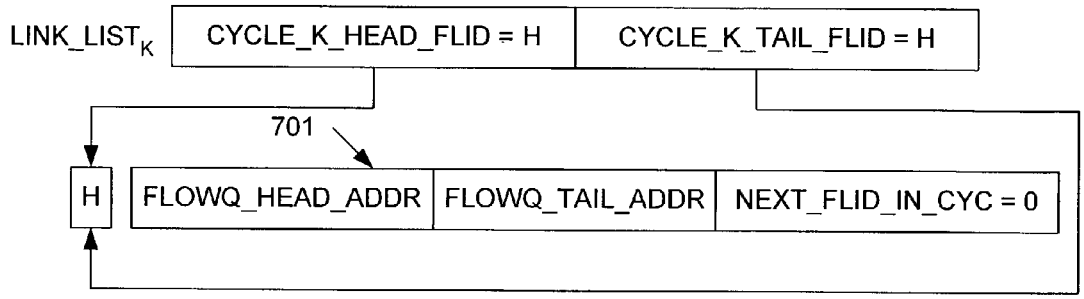
FIGS. 8A-8F are block diagrams illustrating the dequeuing of a cycle link list of the round-robin table of FIG. 3 in accordance with one embodiment of the present invention.

FIG. 8A is a block diagram of a cycle link list Link_List$_K$ of round-robin table 300 in accordance with the present example. As described above, the DDR scheduler determines that the first packet queue entry 500A of the flow having a FLID value of "H" is to be dequeued during cycle "K". Thus, the flow table entry 701 of the flow having a FLID "H" must be linked to cycle "K". To accomplish this, the DDR scheduler causes the address of flow table entry 701 (i.e., "H") to be written to the head FLID pointer (Cycle_K_Head_FLID) and the tail FLID pointer (Cycle_K_Head_FLID) of Link_List$_K$. In the present example, it is assumed that FLID "H" is the first flow added to Link_List$_K$. As a result, the Next_FLID_in_Cyc pointer of flow table entry 701 is initially written with a null value. Note that the packet queue entries 500A-500C associated with flow table entry 701 are not illustrated in FIG. 8A for purposes of clarity.

Figure 8B:
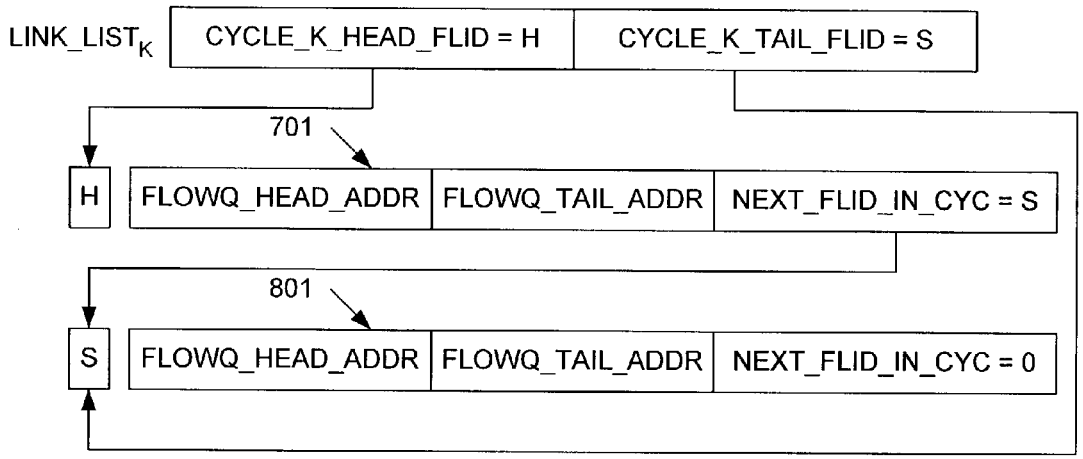

As illustrated in FIG. 8B, the DDR scheduler determines that the flow having a FLID value of "S" also includes a packet queue entry to be dequeued during cycle "K". Thus, the flow table entry 801 of this flow must be linked to the tail of Link_List$_K$. To accomplish this, the DDR scheduler causes the address of flow table entry 801 (i.e., "S") to be written to the tail FLID pointer (Cycle_K_Head_FLID) of Link_List$_K$. At this time, the DDR scheduler also writes the address "S" to the Next_FLID_in_Cyc pointer of flow table entry 701, thereby linking the flows identified by FLID values "H" and "S". The Next_FLID_in_Cyc pointer of flow table entry 801 is initially written with a null value. Note that the packet queue entries associated with flow table entry 801 are not illustrated in FIG. 8B for purposes of clarity.

Figure 8C:
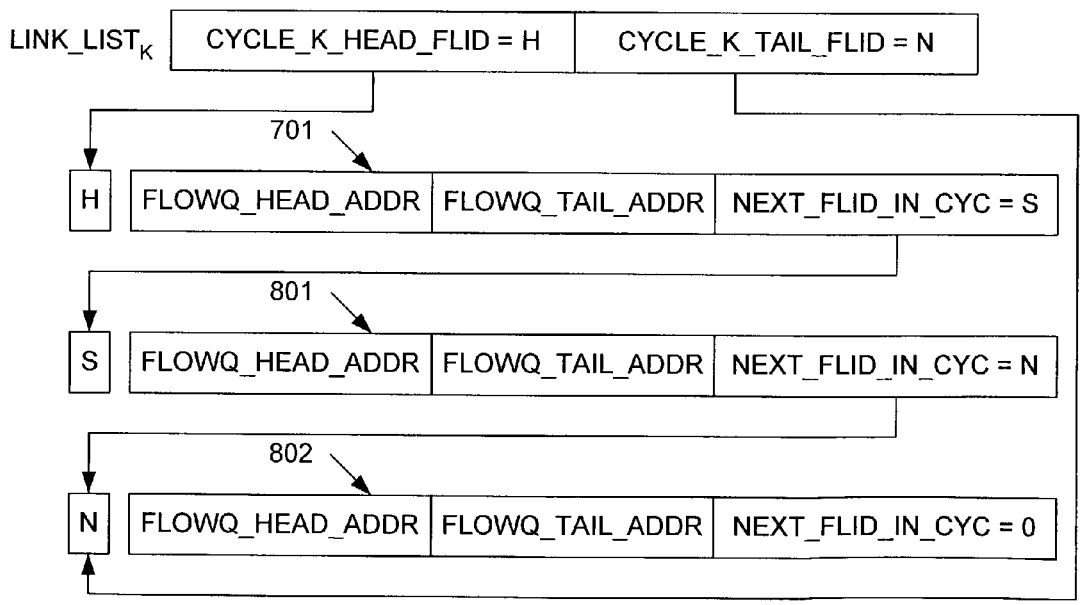

As illustrated in FIG. 8C, the DDR scheduler determines that the flow having a FLID value of "N" also includes a packet queue entry to be dequeued during cycle "K". Thus, the flow table entry 802 of this flow must be linked to the tail of Link_List$_K$. To accomplish this, the DDR scheduler causes the address of flow table entry 802 (i.e., "N") to be written to the tail FLID pointer (Cycle_K_Tail_FLID) of Link_List$_K$. At this time, the DDR scheduler also writes the address "N" to the Next_FLID_in_Cyc pointer of flow table entry 801, thereby linking the flows identified by FLID values "S" and "N". The Next_FLID_in_Cyc pointer of flow table entry 802 is initially written with a null value. Note that the packet queue entries associated with flow table entry 802 are not illustrated in FIG. 8C for purposes of clarity.

The DRR scheduler subsequently processes Link_List$_K$ in the following manner. The DRR scheduler initially processes the flow table entry identified by the Cycle_K_Head_FLID of Link_List$_K$. In the present example, the Cycle_K_Head_FLID identifies flow table entry 701 at address "H". Thus, the DRR scheduler dequeues the first packet queue entry 500A associated with flow table entry 701 in the manner described above. As described above, the DRR scheduler determines that second packet queue entry 500B associated with flow table entry 701 is to be dequeued during cycle "J". Thus, flow table entry 701 is added to the tail of Link_List$_J$ in the manner illustrated by FIGS. 8A-8C. In the described example, flow table entry 701 is the first flow table entry to Link_List$_J$, although this is not necessary.

The DRR scheduler also copies the Next_FLID_in_Cyc pointer ("S") read from flow table entry 701 to the Cycle_K_Head_FLID pointer of Link_List$_K$, thereby indicating that this flow will be dequeued next.

Figure 8D:
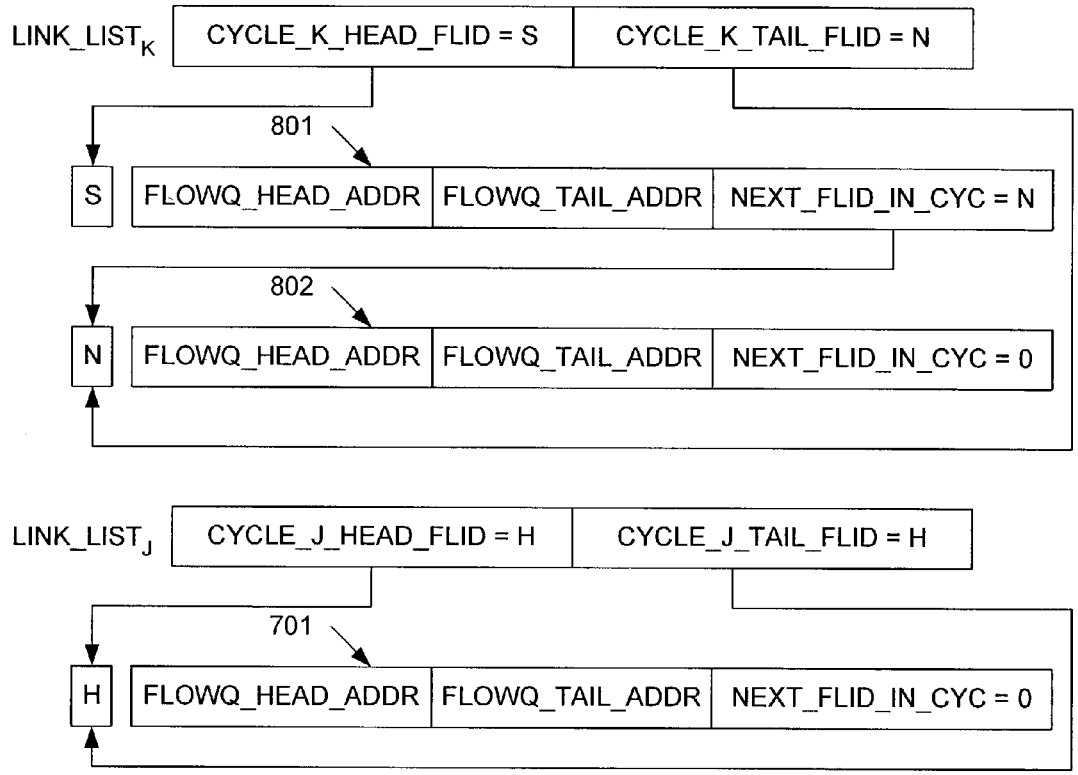

FIG. 8D illustrates Link_List$_K$ and Link_List$_J$ after the first packet queue entry associated with flow table entry 701 has been dequeued.

Next, the DRR scheduler processes the flow table entry 801 identified by the new Cycle_K_Head_FLID of Link_List$_K$. In the present example, the new Cycle_K_Head_FLID identifies flow table entry 801 at address "S". Thus, the DRR scheduler dequeues the first packet queue entry associated with flow table entry 801 in the manner described above. In the present example, the DRR scheduler determines that there are no more packet queue entries associated with the flow identified by FLID value "S". Thus, flow table entry 801 is not added to the tail of any cycle link list.

The DRR scheduler also copies the Next_FLID_in_Cyc pointer ("N") read from flow table entry 801 to the Cycle_K_Head_FLID pointer of Link_List$_K$, thereby indicating that this flow will be dequeued next.

Figure 8E:
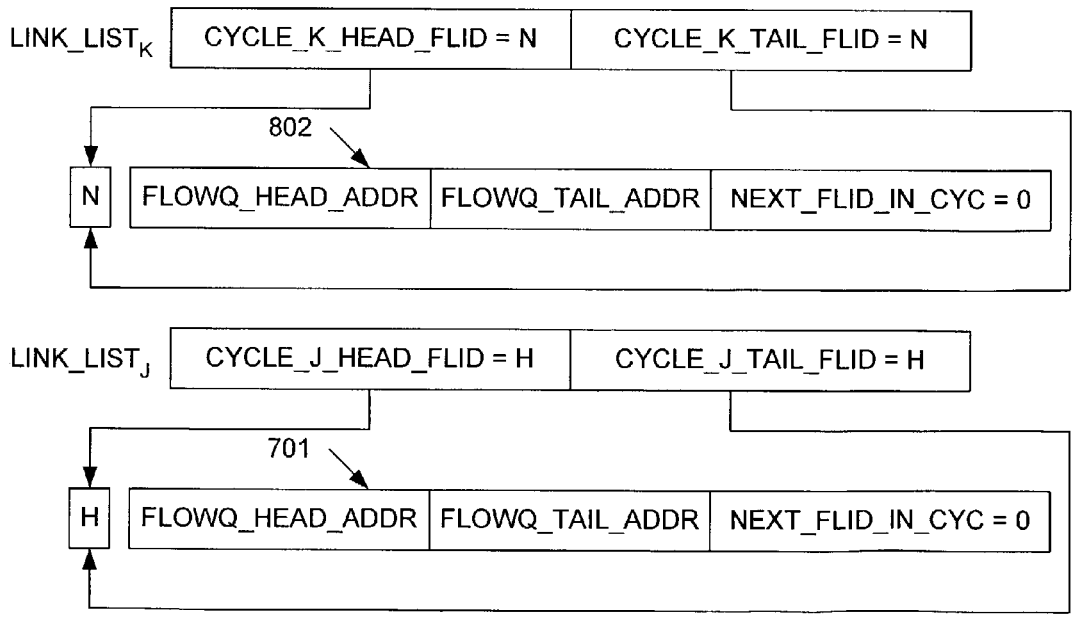

FIG. 8E illustrates Link_List$_K$ and Link_List$_J$ after the packet queue entry associated with flow table entry 801 has been dequeued.

Finally, the DRR scheduler processes the flow table entry 802 identified by the new Cycle_K_Head_FLID of Link_List$_K$. In the present example, the new Cycle_K_Head_FLID identifies flow table entry 802 at address "N". Thus, the DRR scheduler dequeues the first packet queue entry associated with flow table entry 802 in the manner described above. In the present example, the DRR scheduler determines that second packet queue entry associated with flow table entry 802 is to be dequeued during cycle "M". Thus, flow table entry 802 is added to the tail of Link_List$_M$ in the manner illustrated by FIGS. 8A-8C. In the described example, flow table entries 811-812 already exist in Link_List$_M$, although this is not necessary.

Because the DRR scheduler has dequeued the last entry of Link_List$_K$, the current cycle "K" becomes idle, and the DDR scheduler begins processing the next non-idle cycle identified by idle cycle register 600. In addition, a logic "1" value is written to the corresponding Cycle_K value in idle cycle register 600, thereby indicating that cycle "K" is idle. Moreover, null values are written to both the Cycle_K_Head_FLID pointer and the Cycle_K_Tail_FLID pointer of Link_List$_K$.

Figure 8F:
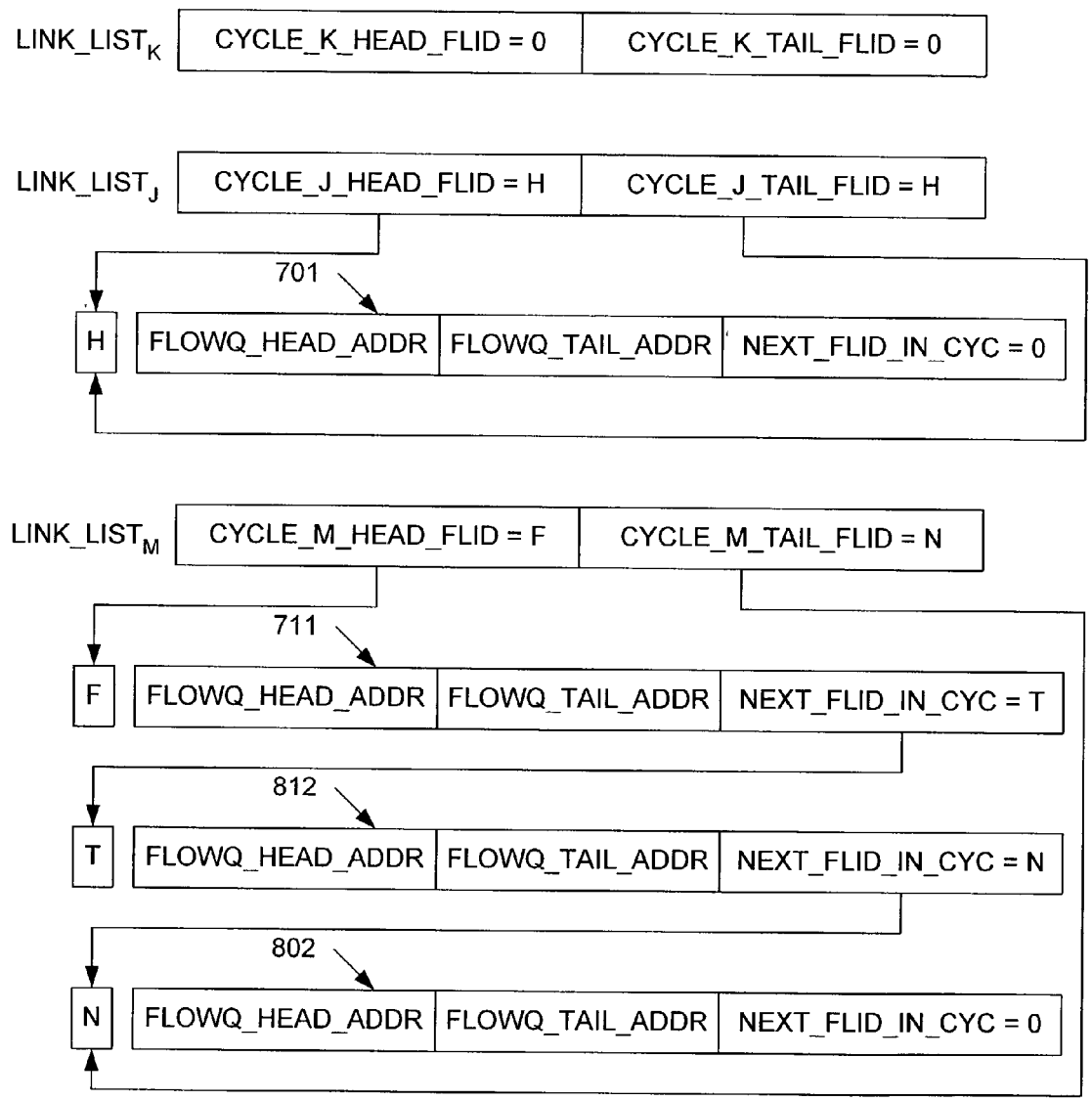

FIG. 8F illustrates Link_List$_K$, Link_List$_J$ and Link_List$_M$ after the packet queue entry associated with flow table entry 802 has been dequeued.

In the foregoing manner, the DRR scheduler uses the three pointers, Cycle_K_Head_FLID, Cycle_K_Tail_FLID and Next_FLID_in_Cyc, to bind the flows of Link_List$_K$ together.

Flow Diagrams Defining the Enqueue Process

Figure 9:
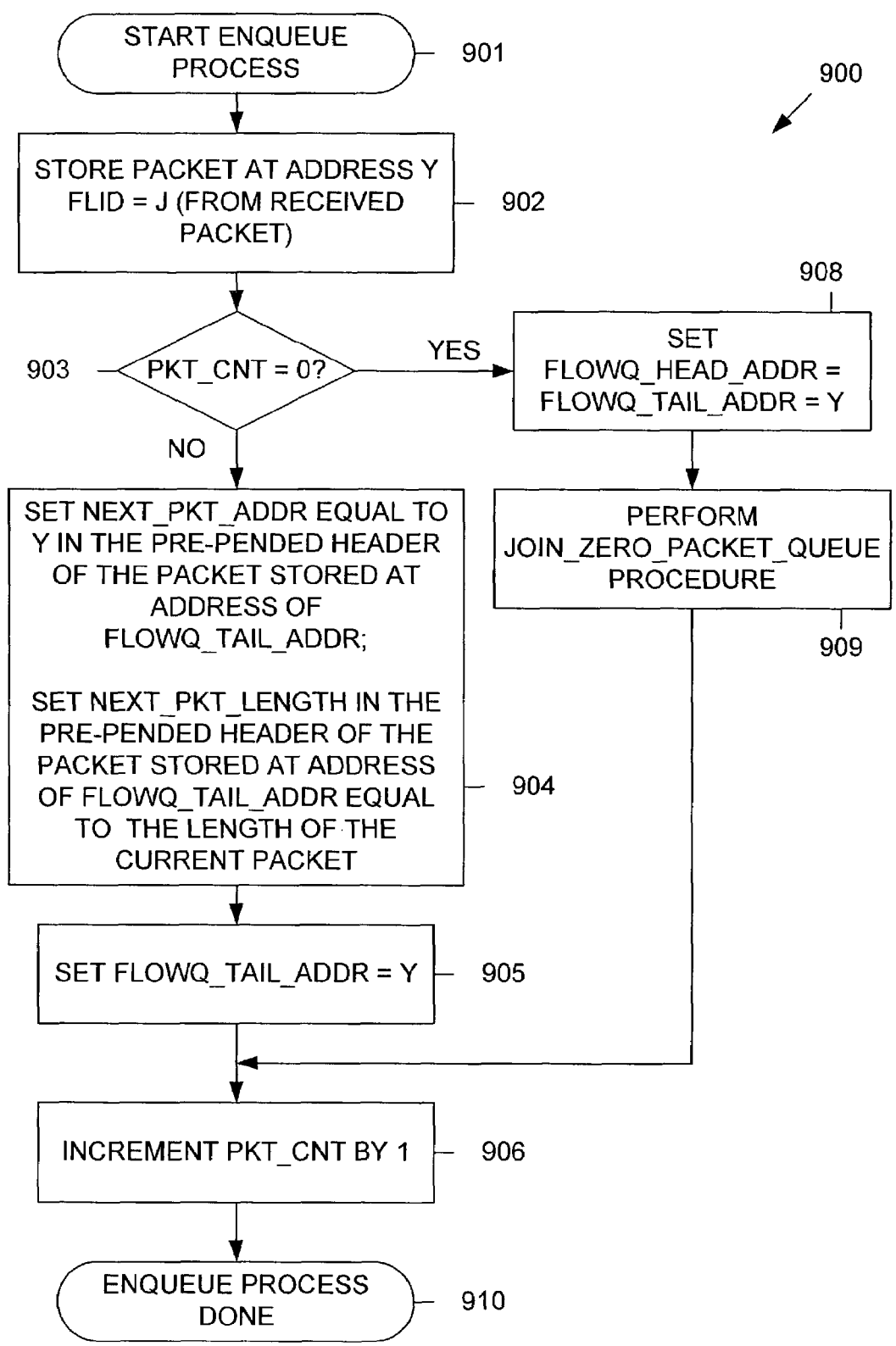
FIG. 9 is a flow diagram summarizing the enqueue process implemented by the DRR scheduler in accordance with one embodiment of the present invention.
Figure 10:
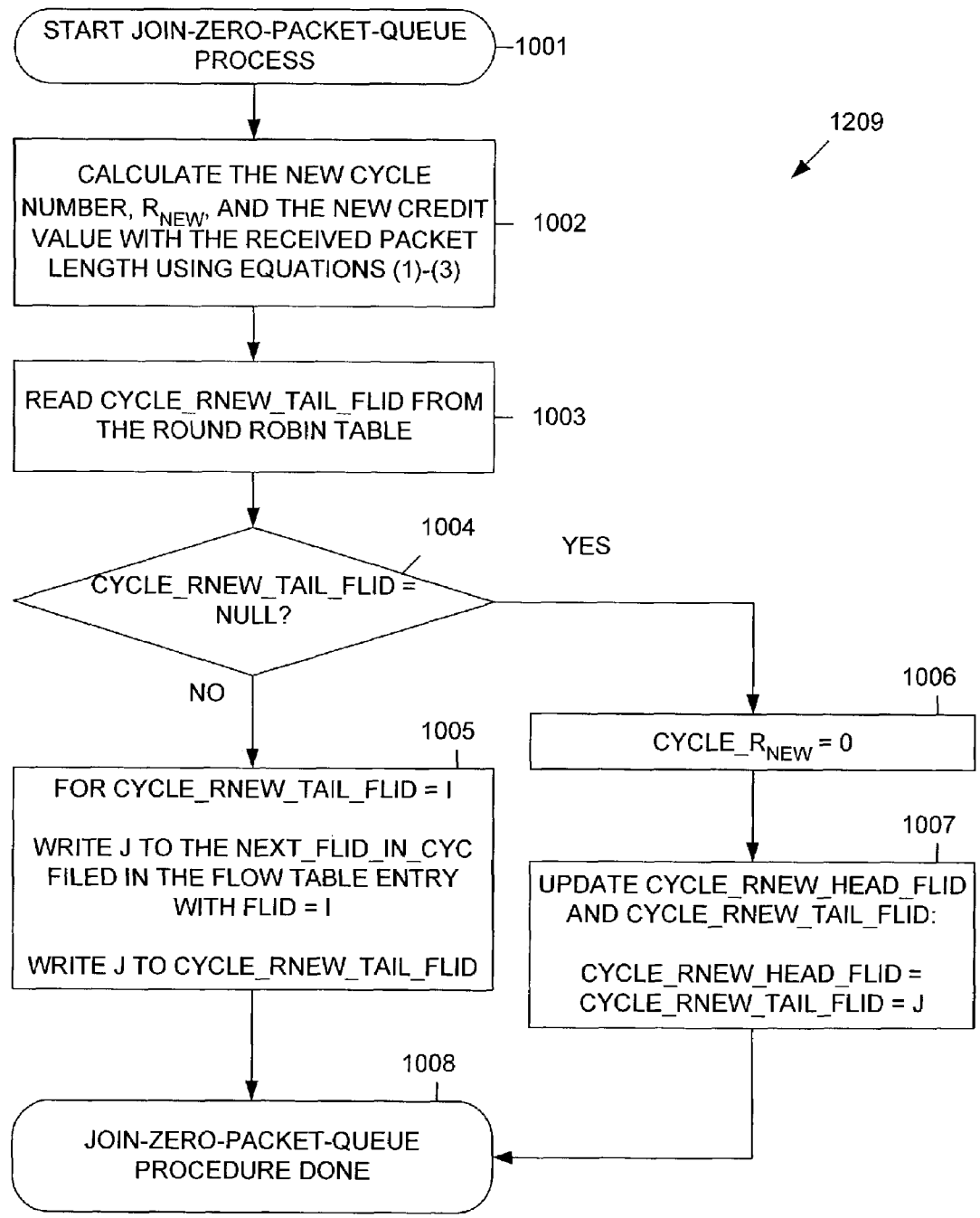
FIG. 10 is a flow diagram illustrating a "Join-Zero-Packet-Queue" procedure of the enqueue process of FIG. 9.

FIG. 9 is a flow diagram 900 summarizing the enqueue process implemented by the DRR scheduler in accordance with one embodiment of the present invention. This enqueue process covers the procedure used when data packets are received from the ingress ports. Flow diagram 900 shows the steps needed for the enqueue process. The "Join-Zero-Packet-Queue" procedure 909 is required when a packet arrives at an empty queue. FIG. 10 is a flow diagram illustrating the "Join-Zero-Packet-Queue" procedure 909.

As illustrated in FIG. 9, when a new data packet is received, the enqueue process starts (Step 901). As described above, the packet includes a corresponding FLID value. The packet is stored in the packet queue associated with a flow table entry having the corresponding FLID value, in the manner described above in FIGS. 7A-7D (Step 902). In the flow diagram of FIG. 9, the address of the packet is designated as address value "Y", and the FLID value is designated as "J" (Step 902).

The DRR scheduler then determines whether the Pkt_Cnt parameter of the flow table entry has a zero value (Step 903). If the Pkt_Cnt parameter is zero, then the current packet represents the first packet of the packet queue. In this case, processing proceeds to Step 908, wherein the FlowQ_Head_Addr and FlowQ_Tail_Addr pointers are set to the packet address value "Y" (see, e.g., FIG. 7A).

Processing then proceeds to join_zero_packet_queue procedure (Step 909), which is illustrated in more detail in FIG. 10. Turning now to FIG. 10, the join_zero_packet_queue procedure starts at Step 1001. The DRR scheduler calculates the new cycle number $R_{NEW}$, and updates the Credit value in accordance with Equations (1)-(3) in the manner described above (Step 1002).

The DRR scheduler then reads the Cycle_$R_{NEW}$_Tail_FLID pointer from Link_List$_{RNEW}$ of round-robin table 300 (Step 1003). If the Cycle_$R_{NEW}$_Tail_FLID pointer has a null value (Step 1004, Yes branch), then the current packet is the first packet assigned to cycle $R_{NEW}$. In this case, the DRR scheduler sets the idle cycle indicator Cycle_$R_{NEW}$ to a "0" value, thereby indicating that the cycle $R_{NEW}$ is now active (Step 1006). The DRR scheduler then updates the Cycle_$R_{NEW}$_Head_FLID and Cycle_$R_{NEW}$_Tail_FLID pointers by writing these pointers with the current FLID value "J" (Step 1007). After this, the join_zero_packet_queue procedure is complete (Step 1008), and processing returns to Step 906 (FIG. 9).

Returning now to Step 1004, if the Cycle_$R_{NEW}$_Tail_FLID pointer does not have a null value (Step 1004, No branch), then the current packet is not the first packet assigned to cycle $R_{NEW}$. In this example, the current value of the Cycle_$R_{NEW}$_Tail_FLID pointer is designated by the symbol "I". In this case, the current FLID value "J" is written to the Next_FLID_in_Cyc pointer in the flow table entry having FLID "I" (Step 1005). The current FLID value "J" is also written to the Cycle_$R_{NEW}$_Tail_FLID pointer (Step 1005). After this, the join_zero_packet_queue procedure is complete (Step 1008), and processing returns to Step 906 (FIG. 9).

Returning now to Step 903 of FIG. 9, if the Pkt_Cnt value is not equal to zero (Step 903, No branch), then there is previous packet stored in the packet queue ahead of the current packet. The pre-pended header of this previous packet is written such that the Next_Pkt_Addr is equal to "Y", and the Next_Pkt_Length is equal to the length of the current packet (Step 904). The FlowQ_Tail_Addr of the corresponding flow table entry is set to a value of "Y", thereby indicating that the current packet has been added to the tail of the packet queue (Step 905).

Processing proceeds from either Step 905 or Step 909 to Step 906, wherein the Pkt_Cnt parameter of the corresponding flow table entry is incremented by one, in order to indicate that another packet has been added to the packet queue. The enqueue process is then complete (Step 910).

Flow Diagrams Defining the Dequeue Process

Figure 11:
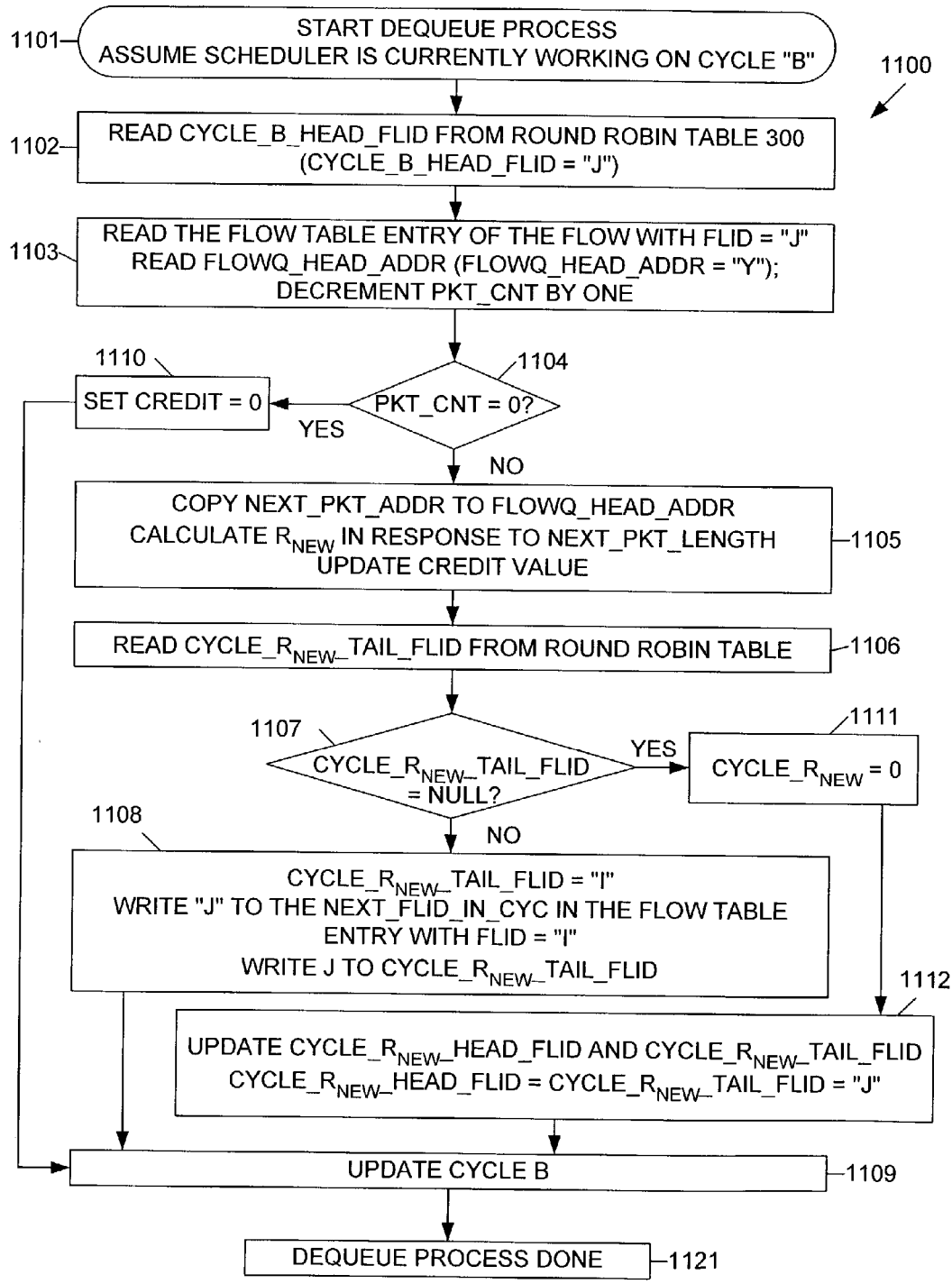
FIG. 11 is a flow diagram summarizing the dequeue process implemented by the DRR scheduler in accordance with one embodiment of the present invention.
Figure 12:
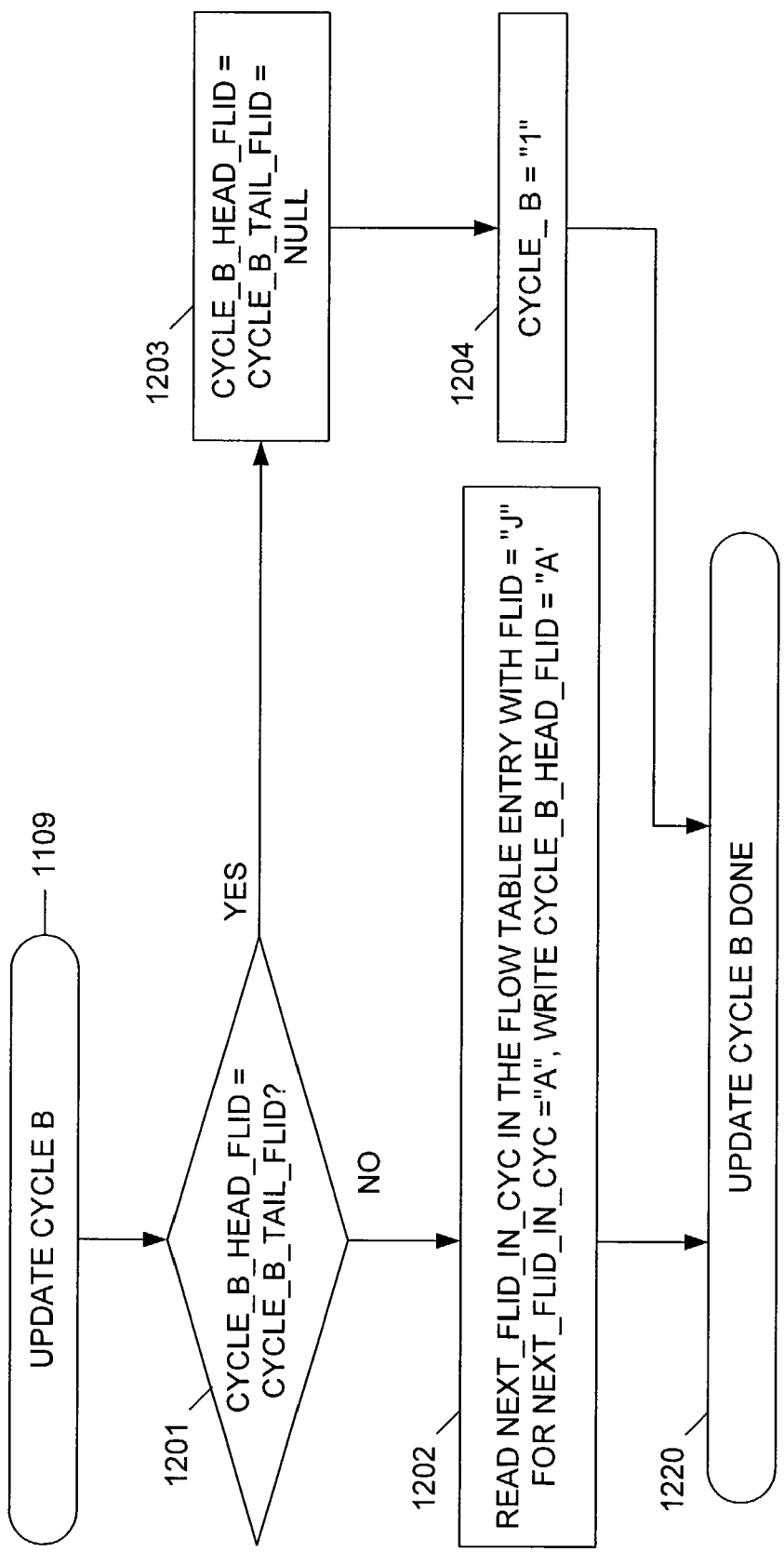
FIG. 12 is a flow diagram illustrating an "Update Cycle B" procedure of the dequeue process of FIG. 11.

FIG. 11 is a flow diagram 1100 summarizing the dequeue process implemented by the DRR scheduler in accordance with one embodiment of the present invention. This dequeue process covers the procedure used when data packets are sent to the egress port. Flow diagram 1100 shows the steps needed for the dequeue process. The "Update Cycle B" procedure 1109 is required at the end of each dequeue process. FIG. 12 is a flow diagram illustrating the "Update Cycle B" procedure 1109.

As illustrated in FIG. 11, when the DRR scheduler starts the dequeue process (Step 1101), the DDR scheduler is currently working on a cycle, which is designated as Cycle "B". The DDR scheduler reads the Cycle_B_Head_FLID from the round-robin table 300 (Step 1102). The Cycle_B_Head_FLID read in this manner is designated as FLID "J". The DDR scheduler then reads the FlowQ_Head_Addr from the flow table entry of the flow with FLID="J", and decrements PKT_CNT of the flow table entry by one. (Step 1103). The FlowQ_Head_Addr from this flow table entry is designated as "Y".

The DDR scheduler then determines whether the Pkt_Cnt of the flow table entry has a value of zero (Step 1104). If the Pkt_Cnt has a value of zero, then the packet queue associated with the flow table entry is empty (Step 1104, Yes branch). In response, the DDR scheduler then resets the Credit value for the flow table entry to a zero value (Step 1110), and processing proceeds to "Update Cycle B" process (Step 1106).

If the DRR scheduler determines the Pkt_Cnt has a non-zero value, then the packet queue associated with the flow table entry is not empty (Step 1104, No branch). In this case, the DRR scheduler copies the Next_Pkt_Addr from the packet stored at address "Y" to the FlowQ_Head_Addr of the flow table entry (Step 1105). The DRR scheduler also reads the Next_Pkt_Length value from the packet stored at address "Y", and in response, calculates $R_{NEW}$ and updates the Credit value in the flow table entry (Step 1105).

Using the newly calculated $R_{NEW}$ value, the DRR scheduler then reads the Cycle_$R_{NEW}$_Tail_FLID value from round-robin table 300 (Step 1106). If this Cycle_$R_{NEW}$_Tail_FLID value is a null value (Step 1107, Yes branch), then the Cycle_$R_{NEW}$ parameter in idle cycle register 600 is set to a logic "0" value, thereby indicating that this cycle $R_{NEW}$ is now active (Step 1111). The DRR scheduler then updates the Cycle_$R_{NEW}$_Head_FLID and Cycle_$R_{NEW}$_Tail_FLID by setting these values equal to "J" (Step 1112). Processing then proceeds to "Update Cycle B" process (Step 1106).

If this Cycle_$R_{NEW}$_Tail_FLID value is not null value (Step 1107, No branch), then there is already at least one flow queued in cycle $R_{NEW}$. The last flow queued in cycle $R_{NEW}$ is designated "I", such that the Cycle_$R_{NEW}$_Tail_FLID is initially equal to "I". The DRR scheduler updates the Cycle_$R_{NEW}$_Tail_FLID by setting this values equal to "J" (Step 1108). The DDR scheduler also updates the Next_FLID_in_Cyc value in the flow table entry having FLID="I" to store a value of "J" (Step 1108). As described above, this effectively adds the flow table entry having FLID="J" to the end of cycle $R_{NEW}$. Processing then proceeds to "Update Cycle B" process (Step 1106).

FIG. 12 is a flow diagram illustrating "Update Cycle B" process 1109. The DRR scheduler determines whether the Cycle_B_Head_FLID is equal to the Cycle_B_Tail_FLID (Step 1201). If so (Step 1201, Yes branch), then the DRR scheduler has processed all of the flow table entries in cycle "B", and therefore sets the Cycle_B_Head_FLID and the Cycle_B_Tail_FLID equal to a null value (Step 1203). The DRR scheduler then sets the Cycle_B parameter in idle cycle register 600 to a logic "1" value, thereby indicating that cycle B is now idle (Step 1204). The "Update Cycle B" process is then complete (Step 1220), and processing continues with Step 1120 (FIG. 11.)

If the Cycle_B_Head_FLID is not equal to the Cycle_B_Tail_FLID (Step 1201, No branch), then the DRR scheduler reads the Next_FLID_in_Cyc parameter from the flow table entry (having a FLID value equal to "J") (Step 1202). This Next_FLID_in_Cyc parameter is designated "A" in the present example. The DRR scheduler writes the value "A" to the Cycle_B_Head_FLID value (Step 1202), thereby moving the next flow table entry to the head of the queue. The "Update Cycle B" process is then complete (Step 1220), and processing continues with Step 1121 (FIG. 11), thereby completing the dequeue process.

Although the invention has been described in connection with several embodiments, it is understood that this invention is not limited to the embodiments disclosed, but is capable of various modifications, which would be apparent to a person skilled in the art. Thus, the invention is limited only by the following claims.

The invention claimed is:

1. A deficit round robin scheduler comprising:
  a round robin table configured to store a plurality of cycle link lists, including a plurality of active cycle link lists, wherein each active cycle link list identifies one or more flows to be processed during a corresponding cycle of the scheduler, and wherein each active cycle link list includes a head flow identification (FLID) value identifying a first flow of the active cycle link list, and a tail FLID value identifying a last flow of the active cycle link list;
  a flow table having a plurality of flow table entries, wherein each of the flow table entries corresponds with a flow to be processed, and wherein each of the flow table entries has a corresponding FLID value; and
  a plurality of packet queues, each associated with a corresponding flow table entry, and each configured to store packets of the flow associated with the corresponding flow table entry,
  wherein the plurality of cycle link lists further include one or more idle cycle link lists, each identifying a cycle of the scheduler where no flows have been scheduled to be processed, the scheduler further comprising an idle cycle register having an idle cycle entry corresponding with each of the cycle link lists, wherein each idle cycle entry identifies the corresponding cycle link list as active or idle.

2. A deficit round robin scheduler comprising:
a round robin table configured to store a plurality of cycle link lists, including a plurality of active cycle link lists, wherein each active cycle link list identifies one or more flows to be processed during a corresponding cycle of the scheduler, and wherein each active cycle link list includes a head flow identification (FLID) value identifying a first flow of the active cycle link list, and a tail FLID value identifying a last flow of the active cycle link list;
a flow table having a plurality of flow table entries, wherein each of the flow table entries corresponds with a flow to be processed, and wherein each of the flow table entries has a corresponding FLID value; and
a plurality of packet queues, each associated with a corresponding flow table entry, and each configured to store packets of the flow associated with the corresponding flow table entry, wherein each flow table entry comprises a packet count parameter to indicate a number of packets stored in the associated packet queue.

3. A deficit round robin scheduler comprising:
a round robin table configured to store a plurality of cycle link lists, including a plurality of active cycle link lists, wherein each active cycle link list identifies one or more flows to be processed during a corresponding cycle of the scheduler, and wherein each active cycle link list includes a head flow identification (FLID) value identifying a first flow of the active cycle link list, and a tail FLID value identifying a last flow of the active cycle link list;
a flow table having a plurality of flow table entries, wherein each of the flow table entries corresponds with a flow to be processed, and wherein each of the flow table entries has a corresponding FLID value; and
a plurality of packet queues, each associated with a corresponding flow table entry, and each configured to store packets of the flow associated with the corresponding flow table entry, wherein each flow table entry includes:
a flow queue head address pointer to point to a first packet in the associated packet queue; and
a flow queue tail address pointer to point to a last packet in the associated packet queue.

4. A deficit round robin scheduler comprising:
a round robin table configured to store a plurality of cycle link lists, including a plurality of active cycle link lists, wherein each active cycle link list identifies one or more flows to be processed during a corresponding cycle of the scheduler, and wherein each active cycle link list includes a head flow identification (FLID) value identifying a first flow of the active cycle link list, and a tail FLID value identifying a last flow of the active cycle link list;
a flow table having a plurality of flow table entries, wherein each of the flow table entries corresponds with a flow to be processed, and wherein each of the flow table entries has a corresponding FLID value; and
a plurality of packet queues, each associated with a corresponding flow table entry, and each configured to store packets of the flow associated with the corresponding flow table entry, wherein each packet stored in a packet queue comprises a pre-pended header including a next packet length parameter (Next_Pkt_Length) identifying a length of a next packet in the packet queue.

5. The deficit round robin scheduler of claim 4, wherein each pre-pended header also includes a next packet address pointer identifying an address (Next_Packet_Address) of a next packet in the packet queue.

6. The deficit round robin scheduler of claim 4, wherein each flow table entry includes a credit value (Credit) and a quantum value (Quantum) of the corresponding flow, and wherein the scheduler is configured to determine a cycle link list with which a flow table entry is associated in response to the credit and quantum values of the flow table entry and a next packet length parameter of a packet of the packet queue associated with the flow table entry.

7. The deficit round robin scheduler of claim 6, wherein there are $R_{MAX}$ cycle link lists, and wherein the deficit round robin scheduler is configured to use the following equations to determine a new cycle, $R_{NEW}$, for processing a flow, after the flow has been processed in a current cycle, $R_{CURRENT}$:

$$R_{OFFSET} = \min\{R_{MAX}-1, (|\text{Next\_Pkt\_Length}-\text{Credit}|/\text{Quantum})\},$$

where $|A-B| = \max\{0, A-B\}$, and $$R_{NEW} = (R_{CURRENT} + R_{OFFSET}) \bmod (R_{MAX}).$$

8. The deficit round robin scheduler of claim 7, wherein the deficit round robin scheduler is configured to update the credit value (Credit) using the following equation:

$$\text{Credit} = \text{Credit} + (\text{Quantum}^* R_{OFFSET}) - \text{Next\_Pkt\_Length}.$$

9. A method of implementing deficit round robin scheduling comprising:
receiving a plurality of packets from a plurality of flows, wherein each packet has an associated flow identification (FLID) value that identifies a flow of the packet;
maintaining a flow table having a flow table entry associated with each flow;
maintaining a packet queue associated with each flow table entry, wherein each packet queue stores the packets of the flow associated with the flow table entry; and
maintaining a round robin table having a plurality of cycle link lists, including a plurality of active cycle link lists, wherein each of the active cycle link lists identifies one or more flow table entries associated with flows to be processed during a corresponding cycle, wherein the plurality of cycle link lists further include one or more idle cycle link lists, each identifying a corresponding cycle where no flows have been scheduled to be processed, the method further comprising maintaining an idle cycle list that identifies each cycle link list as either an active cycle link lists- or an idle cycle link list.

10. The method of claim 9, further comprising processing active cycle link lists, but not idle cycle link lists.

11. A method of implementing deficit round robin scheduling comprising:
receiving a plurality of packets from a plurality of flows, wherein each packet has an associated flow identification (FLID) value that identifies a flow of the packet;
maintaining a flow table having a flow table entry associated with each flow;
maintaining a packet queue associated with each flow table entry, wherein each packet queue stores the packets of the flow associated with the flow table entry;
maintaining a round robin table having a plurality of cycle link lists, including a plurality of active cycle link lists, wherein each of the active cycle link lists identifies one or more flow table entries associated with flows to be processed during a corresponding cycle;

storing a flow queue head address value in each flow table entry, wherein each flow queue head address value identifies an address of a first packet in the packet queue associated with the flow table entry; and storing a flow queue tail address value in each flow table entry, wherein each flow queue tail address value identifies an address of a last packet in the packet queue associated with the flow table entry.

12. The method of claim 11, further comprising pre-pending a header to each of the packets, wherein each header identifies an address of a next packet in the same packet queue and the length of the next packet in the same packet queue.

13. A method of implementing deficit round robin scheduling comprising:

receiving a first packet having a first length (Pkt Length) from a first flow having an associated flow identification (FLID) value;

storing the first packet at a first address location in a memory;

linking the first packet to a first flow table entry for the first flow, wherein the first flow table entry includes a first credit value (Credit) and a first quantum value (Quantum) associated with the first flow;

calculating a first new cycle ($R_{NEW}$) and a first new credit value ($Credit_{new}$) in response to the first credit value (Credit), the first quantum value (Quantum), and the first length (Pkt Length);

adding the flow table entry to the end of the first new cycle ($R_{NEW}$);

determining whether the first flow table entry is the only entry of the first new cycle, and if so, then updating a first idle cycle identifier associated with the first new cycle, thereby indicating that the first new cycle is active.

14. A method of implementing deficit round robin scheduling comprising:

receiving a first packet having a first length (Pkt Length) from a first flow having an associated flow identification (FLID) value;

storing the first packet at a first address location in a memory;

linking the first packet to a first flow table entry for the first flow, wherein the first flow table entry includes a first credit value (Credit) and a first quantum value (Quantum) associated with the first flow;

calculating a first new cycle ($R_{NEW}$) and a first new credit value ($Credit_{new}$) in response to the first credit value (Credit), the first quantum value (Quantum), and the first length (Pkt Length);

adding the flow table entry to the end of the first new cycle ($R_{NEW}$);

determining whether the first packet is the only packet of the first flow stored in the memory, and if so, then linking the first packet to the first flow table entry by writing the first address to a head address field and a tail address field of the first flow table entry.

15. A method of implementing deficit round robin scheduling comprising:

receiving a first packet having a first length (Pkt Length) from a first flow having an associated flow identification (FLID) value;

storing the first packet at a first address location in a memory;

linking the first packet to a first flow table entry for the first flow, wherein the first flow table entry includes a first credit value (Credit) and a first quantum value (Quantum) associated with the first flow;

calculating a first new cycle ($R_{NEW}$) and a first new credit value ($Credit_{new}$) in response to the first credit value (Credit), the first quantum value (Quantum), and the first length (Pkt Length);

adding the flow table entry to the end of the first new cycle ($R_{NEW}$);

determining whether the first packet is the only packet of the first flow stored in the memory, and if not, then linking the first packet to the first flow table entry by writing the first address to a tail address field of the first flow table entry, and writing the first address to a pre-pended header of a last packet of the first flow stored in the memory.

16. A method of implementing deficit round robin scheduling comprising:

receiving a first packet having a first length (Pkt Length) from a first flow having an associated flow identification (FLID) value;

storing the first packet at a first address location in a memory;

linking the first packet to a first flow table entry for the first flow, wherein the first flow table entry includes a first credit value (Credit) and a first quantum value (Quantum) associated with the first flow;

calculating a first new cycle ($R_{NEW}$) and a first new credit value ($Credit_{new}$) in response to the first credit value (Credit), the first quantum value (Quantum), and the first length (Pkt Length); and adding the flow table entry to the end of the first new cycle ($R_{NEW}$), wherein the first new cycle ($R_{NEW}$) is determined by the following equations, wherein $R_{CURRENT}$ represents a current cycle, and $R_{MAX}$ represents a total number of cycles:

$$R_{NEW} = (R_{CURRENT} + R_{OFFSET}) \bmod (R_{MAX});$$

$$R_{OFFSET} = \min\{R_{MAX}+1, (|\text{Pkt\_Length} - \text{Credit}|/\text{Quantum})\},$$

where $|A-B| = \max\{0, A-B\}$.

17. The method of claim 16, wherein the new credit value ($Credit_{new}$) is determined by the following equation:

$$Credit_{new} = Credit + (Quantum * R_{OFFSET}) - \text{Pkt\_Length}.$$

18. A method comprising:

identifying the length of a first packet associated with a first flow;

storing the first packet in a first queue associated with the first flow;

determining a first cycle in which the first packet should be processed in response to the length of the first packet and credit and quantum parameters associated with the first flow;

linking the first flow to a first cycle link list associated with the first cycle, wherein the first cycle link list is one of a plurality of cycle link lists having a flow linked thereto;

processing the first cycle link list in the first cycle, such that the first packet is transmitted from the first queue in the first cycle;

identifying the length of a second packet associated with the first flow;

storing the second packet in the first queue;

determining a second cycle in which the second packet should be processed in response to the length of the second packet and the credit and quantum parameters associated with the first flow, wherein the second cycle is determined during the first cycle;

linking the first flow to a second cycle link list associated with the second cycle; and including the length of the second packet in a header of the first packet.

19. The method of claim 18, further comprising including an address associated with the second packet in the header of the first packet.

* * * * *